United States Patent
Lehn et al.

(10) Patent No.: US 12,334,837 B2
(45) Date of Patent: Jun. 17, 2025

(54) CONVERTER MODULATION FOR REDUCTION OF COMMON-MODE LEAKAGE CURRENT

(71) Applicants: THE GOVERNING COUNCIL OF THE UNIVERSITY OF TORONTO, Toronto (CA); ELEAPPOWER LTD., Toronto (CA)

(72) Inventors: Peter Waldemar Lehn, Toronto (CA); Caniggia Castro Diniz Viana, Toronto (CA); Sepehr Semsar, Thornhill (CA); Mehanathan Pathmanathan, Toronto (CA)

(73) Assignees: INNOVATIONS & PARTNERSHIPS OFFICE UNIVERSITY OF TORONTO, Toronto (CA); ELEAPPOWER LTD., Toronto (CA)

( * ) Notice: Subject to any disclaimer, the term of this patent is extended or adjusted under 35 U.S.C. 154(b) by 174 days.

(21) Appl. No.: 18/013,165

(22) PCT Filed: Jun. 24, 2021

(86) PCT No.: PCT/CA2021/050871
§ 371 (c)(1),
(2) Date: Dec. 27, 2022

(87) PCT Pub. No.: WO2021/258212
PCT Pub. Date: Dec. 30, 2021

(65) Prior Publication Data
US 2023/0246560 A1   Aug. 3, 2023

Related U.S. Application Data

(60) Provisional application No. 63/043,573, filed on Jun. 24, 2020.

(51) Int. Cl.
*H02M 5/458* (2006.01)
*B60L 53/14* (2019.01)
(Continued)

(52) U.S. Cl.
CPC .............. *H02M 5/458* (2013.01); *B60L 53/14* (2019.02); *H02M 1/123* (2021.05); *H02M 1/126* (2013.01); *H02M 1/4208* (2013.01)

(58) Field of Classification Search
CPC ..... H02M 1/123; H02M 1/4208; H02M 5/458
See application file for complete search history.

(56) References Cited

U.S. PATENT DOCUMENTS 9,935,544 B2 *   4/2018   Zubieta ................. H02M 3/155

FOREIGN PATENT DOCUMENTS

WO   WO-2018227307 A1 * 12/2018 ............. B60L 50/40
WO   WO-2019071360 A1 *  4/2019 ............. B60L 50/60

OTHER PUBLICATIONS

Canadian Intellectual Property Office (CIPO), Office Action in CA Application No. 3,178,925 dated Apr. 4, 2024.
(Continued)

*Primary Examiner* — Gary A Nash
(74) *Attorney, Agent, or Firm* — Norton Rose Fulbright Canada LLP

(57) ABSTRACT

An approach for controlling operation of an electrically symmetrical electric power circuit is described herein to reduce common mode leakage currents. The approach can include, for example, a controller circuit configured to control a plurality of switches of the electrically symmetrical electric power circuit, such that one or more electrically symmetrical pairs of switches of the plurality of switches are operated at a same operational state when the power circuit is coupled to an electrical grid to reduce the common mode leakage current. A variant is also described that is adapted
(Continued)

for current ripple and overall THD distortion reduction, which can be useful for vehicle to grid power transfer situations.

20 Claims, 38 Drawing Sheets

(51) Int. Cl.
*H02M 1/12* (2006.01)
*H02M 1/42* (2007.01)

(56) References Cited

OTHER PUBLICATIONS

Canadian Intellectual Property Office (CIPO), International Search Report and Written Opinion to PCT/CA2021/050871, Aug. 31, 2021.

Kalaisel VI et al., "Bearing Currents and Shaft Voltage Reduction in Dual-Inverter-Fed Open-End Winding Induction Motor With Reduced CMV PWM Methods", IEEE Transactions on Industrial Electronics, vol. 62, No. 1, pp. 144-152, Jul. 8, 2014 (Jul. 8, 2014), [online] [retrieved on Jul. 6, 2021 (Jul. 7, 2021)], Retrieved from the Internet: https://ieeexplore.ieee.org/document/6850069.

Yang et al., "Improved Transformerless Inverter With Common-Mode Leakage Current Elimination for a Photovoltaic Grid-Connected Power System", IEEE Transactions on Power Electronics, vol. 27, No. 2, pp. 752-762, Jun. 23, 2011 (Jun. 23, 2011), [online] [retrieved on Jul. 6, 2021 (Jul. 7, 2021)], Retrieved from the Internet: https://ieeexplore.ieee.org/document/5928426.

MS. Jasmine B. et al., "Leakage Current Elimination in Single Phase Transformerless Grid Connected Power Systems", International Journal of Innovative Research in Electrical, Electronics, Instrumentation and Control Engineering, vol. 2, Issue 3, pp. 1266-1271, Mar. 2014 (Mar. 2014), [online] [retrieved on Jul. 6, 2021 (Jul. 7, 2021)], Retrieved from the Internet: https://ijireeice.com/wp-content/uploads/2013/03/IJIREEICE3G-ajasmine-Leakage.pdf.

Szymanski et al., "Ground Leakage Current Caused by Common-Mode Voltage of PWM Inverter", Journal of civil engineering and transport, vol. 1, Issue 1, 2019, pp. 15-25, Dec. 31, 2019 (Dec. 31, 2019), [online] [retrieved on Jul. 6, 2021 (Jul. 7, 2021)], Retrieved from the Internet: http://economicresearch.pl/Journals/index.php/tren/issue/view/136.

\* cited by examiner

Naïve Approach

Naïve Approach

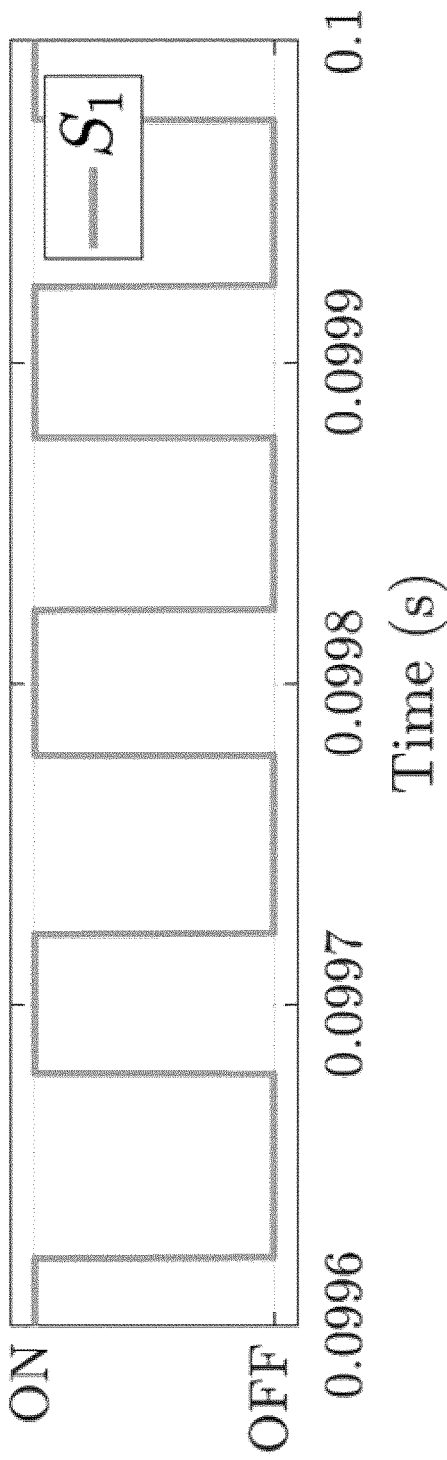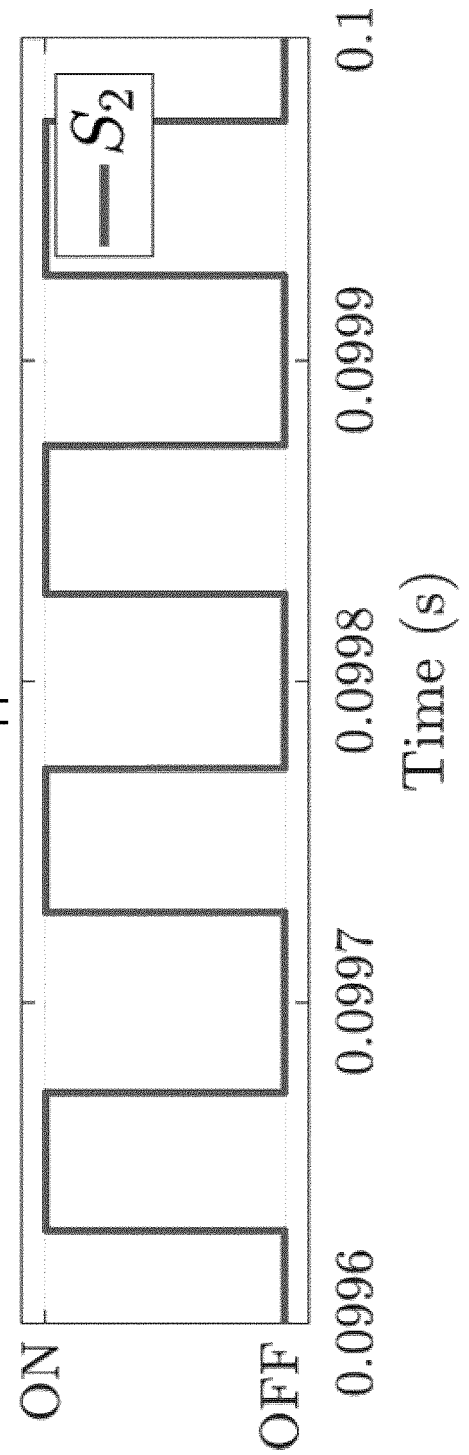
FIG. 11C
Naïve Approach
FIG. 11D
Naïve Approach

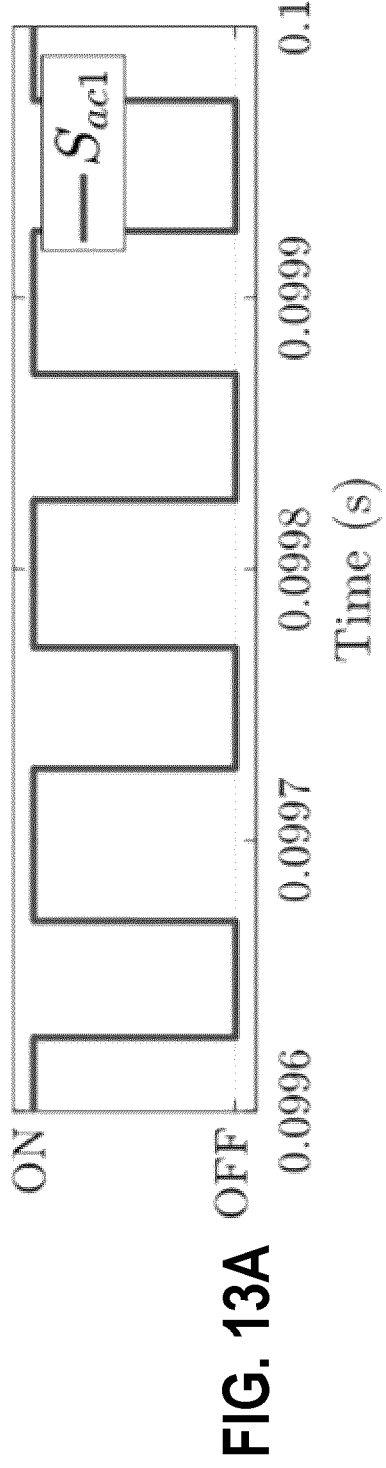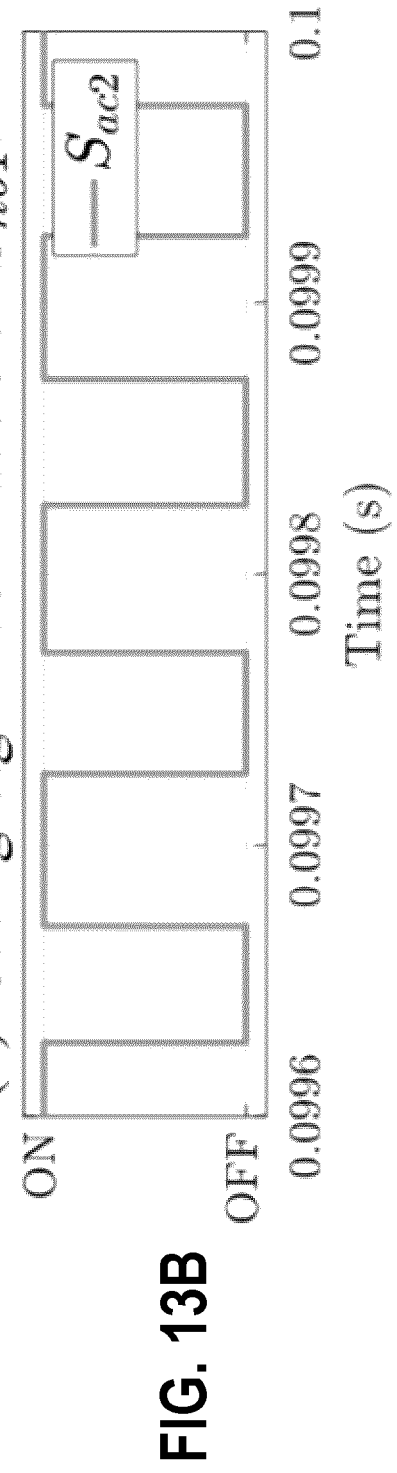
FIG. 13A (a) Gating signal for transistor $S_{hb1}$.
FIG. 13B (b) Gating signal for transistor $S_{hb2}$.

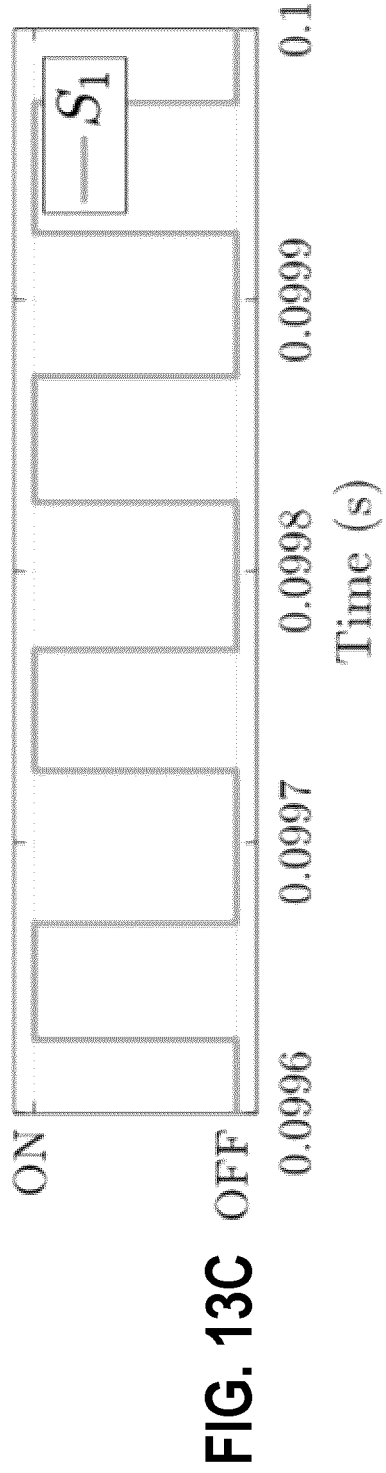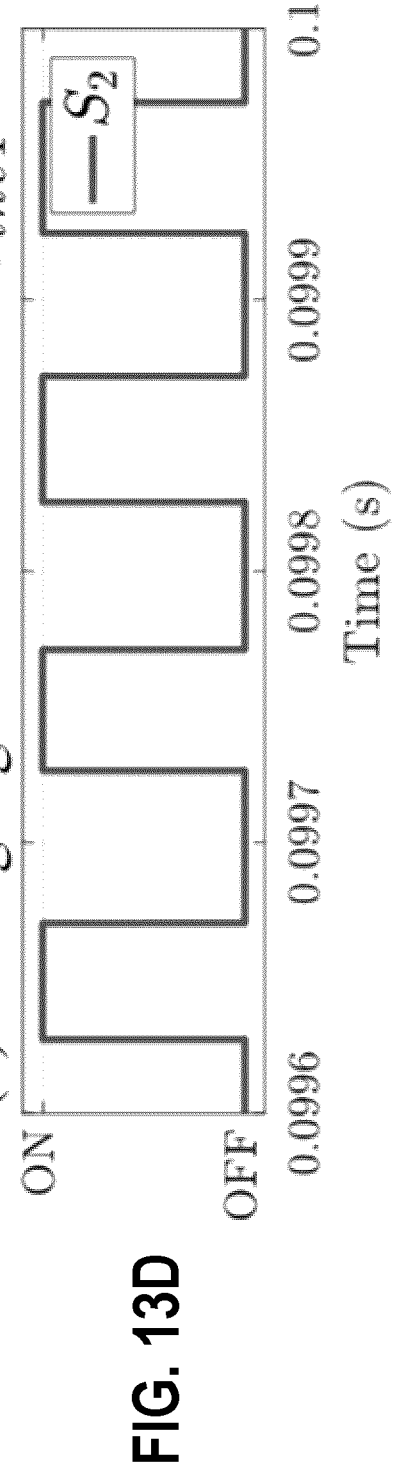
FIG. 13C (c) Gating signal for transistor $S_{inv1}$.
FIG. 13D (d) Gating signal for transistor $S_{inv2}$.

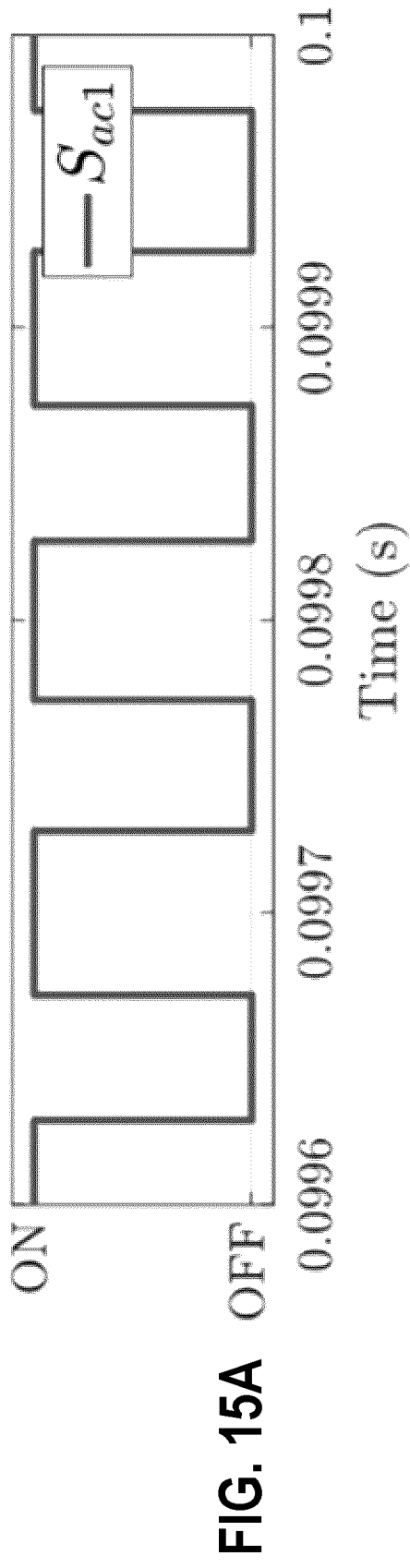
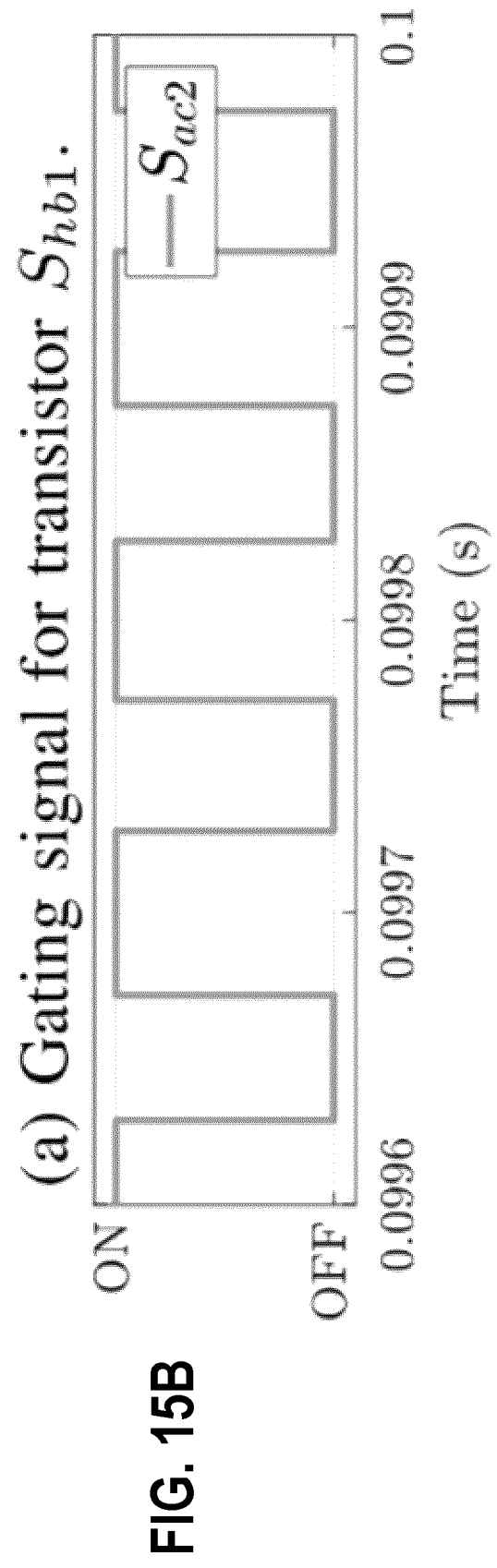
FIG. 15A (a) Gating signal for transistor $S_{hb1}$.
FIG. 15B (b) Gating signal for transistor $S_{hb2}$.

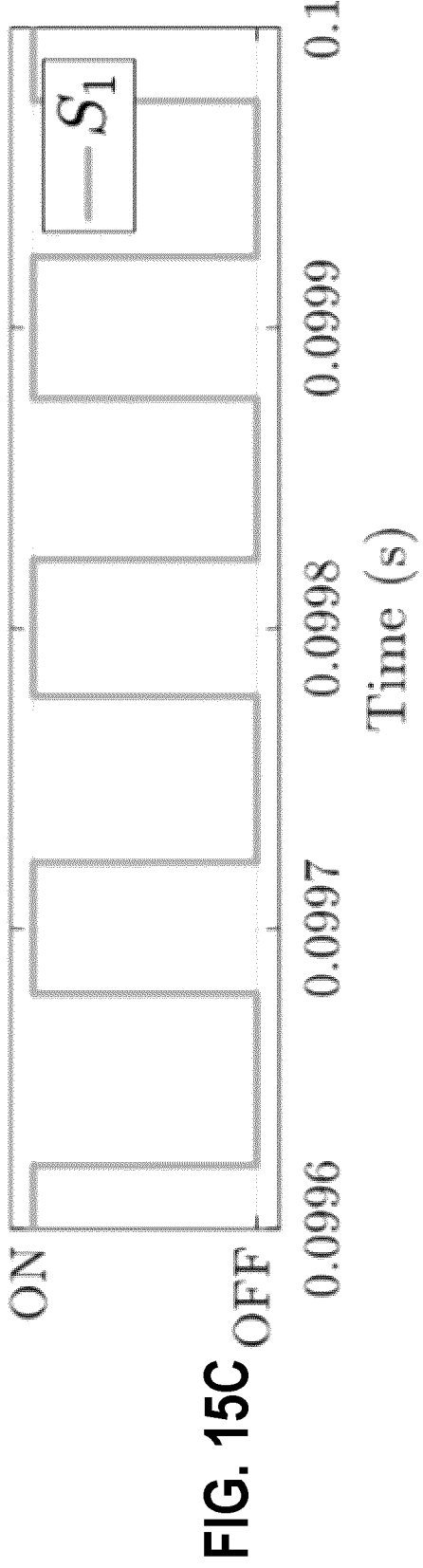
FIG. 15C (c) Gating signal for transistor $S_{inv1}$.
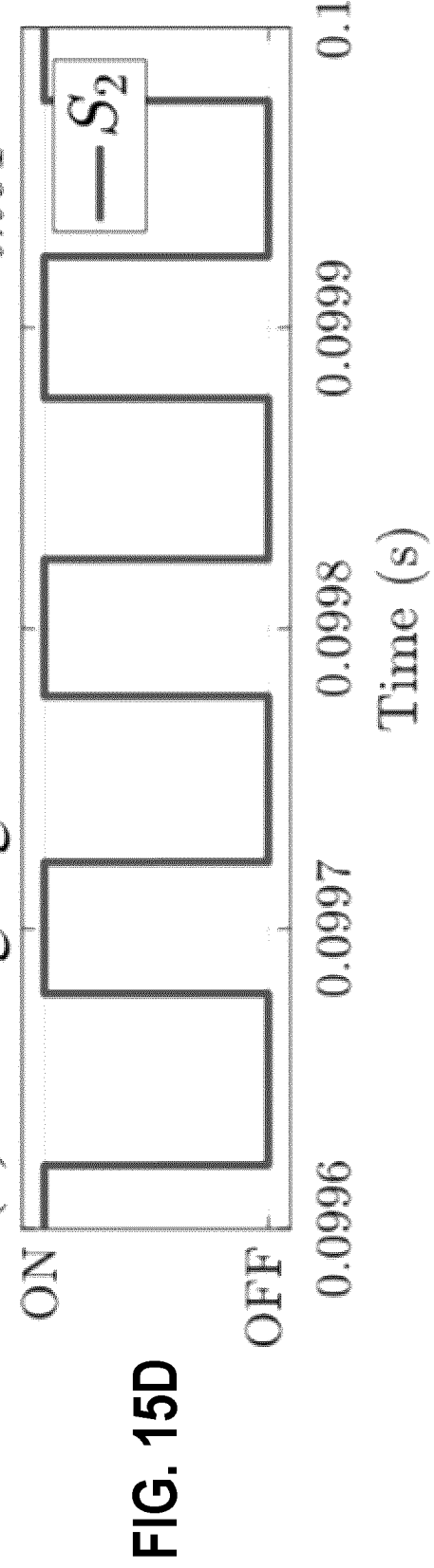
FIG. 15D (d) Gating signal for transistor $S_{inv2}$.

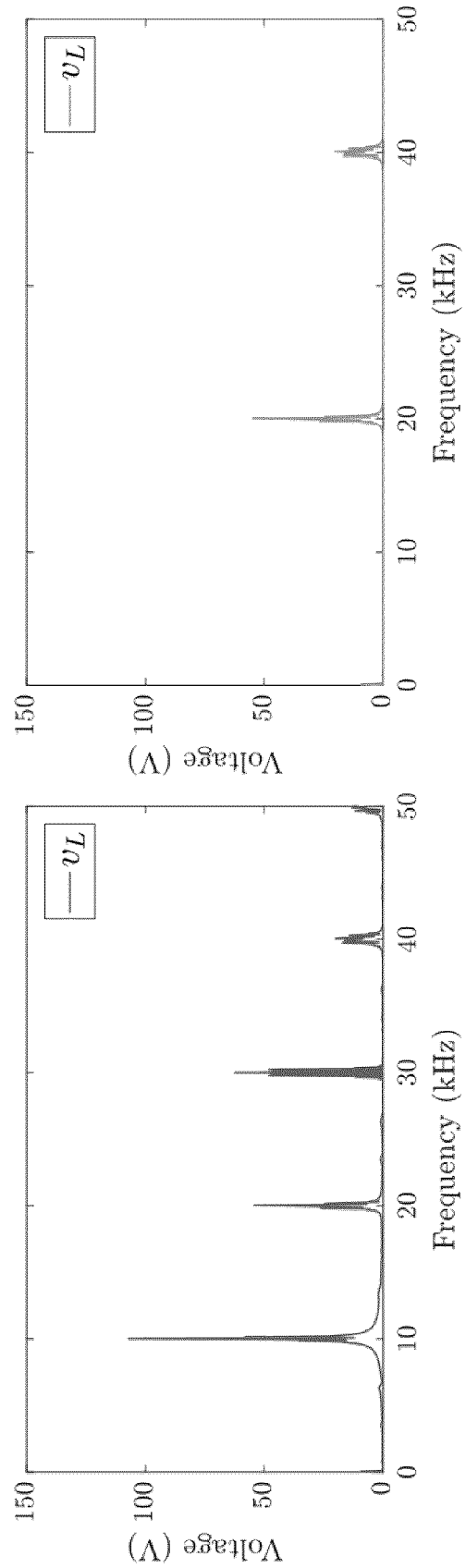
FIG. 17A (a) Symmetrical bipolar modulation.
FIG. 17B (b) Symmetrical unipolar modulation.

(b) Grid leakage current.

CONVERTER MODULATION FOR REDUCTION OF COMMON-MODE LEAKAGE CURRENT

CROSS-REFERENCE

This application is a non-provisional of, and claims all benefit to, including priority from, U.S. Application No. 63/043,573, filed 2020 Jun. 24, entitled CONVERTER MODULATION FOR REDUCTION OF COMMON-MODE LEAKAGE CURRENT, incorporated herein by reference in its entirety.

FIELD

Embodiments of the present disclosure generally relate to the field of electrical charger technology, and more specifically, embodiments relate to devices, systems and methods for reducing common-mode leakage current, and/or harmonic distortions.

INTRODUCTION

Electric vehicles (EV) have attracted significant interest in the mobility market in recent years. As environmental concerns mount and EV technology improves, electromobility is expected to gain market share and increase its economic and social relevance.

Charging infrastructure is a critical aspect of this transformation. As EV penetration grows, so do the demands from the charging network, in terms of power density, efficiency, and cost, prompting intense research and development effort from both academia and industry.

SUMMARY

The presence of common-mode currents on non-isolated converters is an important consideration when designing circuit topologies for implementation. In particular, this issue has ramifications in both safety and competitiveness, as transformers are typically the solution of choice and may introduce severe disadvantages for high power circuits. Improved high power circuits described herein can, for example, include circuits configured for the charging to or from electric vehicles, including improved on-board circuitry adapted to reside on or coupled to the electric vehicle itself, and/or improved circuitry for a charging station adapted to charge to/from the electric vehicle. As described herein, the improved circuits are adapted to provide a practical, technical improvement in the electric properties of the operation of the electrical systems, improving, for example, a potential safety profile by reducing leakage currents and/or distortion for non-isolated converters. Accordingly, certain benefits of converter isolation may be achieved using circuit control mechanisms instead of converter isolation, potentially reducing circuit complexity, weight, and component expense. Applicants have experimentally validated certain embodiments of the described approaches.

A common-mode performance analysis is provided to describe the tools that may be used to address common-mode leakage currents without the utilization of isolation transformers, which may result in potentially cheaper, more power dense and efficient converter topologies.

Common-mode leakage currents can be dangerous, especially in the context of electric vehicle charging. For example, ground faults could occur and yield an unsafe condition where someone could be injured or property could be damaged. Accordingly, many electric chargers have requirements around preventing ground faults. While an approach that has been considered involves the use of electrical isolation, these approaches can be impractical and bulky, as well as expensive. Bulky (e.g., large volume) circuits can particularly be impractical in the context of portable electronics, such as those provided on electric vehicles or electrical vehicle infrastructure.

A modulation technique capable of eliminating common-mode leakage current on symmetrical non-isolated converters is introduced instead in various embodiments described herein. The proposed modulation approach, in some cases, is beneficial as it can operate without requiring additional hardware and can impose minimum or no additional cost onto power converters. The proposed modulation approach is a technical solution to a technical problem that relates to improving the safety of the circuit (e.g., reducing the likelihood of an unsafe common-mode leakage current that could cause injuries in the event of a ground fault). A further variation is described in another embodiment herein that also reduces total harmonic distortion (THD). The THD reduction variation, for example, can be accomplished using similar electrical components, but with different control software or firmware being utilized.

One suitable application for the discussed technique is the charging of electric vehicles, where the increased density and efficiency could have decisive commercial implications, since such features are intimately linked with vehicle range and charging time.

A novel symmetrical DC fast-charging topology based on the dual-inverter drivetrain is also introduced which is also compatible with the presented modulation approach of various embodiments. The modulation is specified for both a single-phase symmetrical charger and the newly proposed symmetrical DC fast charger. The modulation technique, in some embodiments, can also be applied for various other symmetrical topologies (e.g., for any symmetrical topology).

Simulation verification is performed for both the single-phase charging circuit and the DC fast charger. The proposed modulation successfully significantly reduces (i.e., eliminates in certain situations) the common-mode leakage current, while maintaining the capability to achieve secondary objectives, such as THD improvement and efficiency optimization. THD is a ratio of energy in the components other than the components that the system is attempting to transmit on, for example, compared to a sine wave. THD is an important consideration in practical application, as grid utilities often have specifications on acceptable THD for compliance (e.g., 5%). The reason for this is that a large THD is not desirable as connected components could have essentially applied a voltage that it they were not designed for. High THD also manifests itself as higher losses (Applicants are mostly interested in the first harmonic)—if there is THD at the switching frequency, this would imply more losses, higher heat (requiring more cooling), increasing the volume of the system. Alternate approaches for reducing THD can include, for example, using larger filters, among others, but these alternate approaches have practical drawbacks in relation to volume and complexity.

Accordingly, variant embodiments are described in relation to other improved electrical characteristics, such as reduction of a current ripple and overall THD reduction. These secondary objectives are provided in the variant embodiments, as noted below. Achieving the secondary objectives is useful, as noted herein, in relation to vehicle to grid power flow variations. However, reducing the leakage current is the more important objective, and Applicants submit that approaches to reducing the leakage current in non-isolated circuit approaches is a novel contribution.

The techniques introduced here are important and useful for the operation of non-isolated integrated chargers using dual inverter drivetrain. Alternative approaches without such a modulation approach can result in high leakage currents, failure to meet regulatory standards and endangerment of operators and passersby, and the proposed approaches described herein aid in improving overall circuit safety through providing technical improvements relating to technical approaches controlling how the circuits are operated.

This approach provides a solution for safe operation and safe commercialization of various types of symmetrical circuits. The solution is suitable for converters that have an inherently symmetrical topology. The proposed approach consists of defining a central symmetry axis and simultaneously switching switches that are equidistant to the symmetry axis. In this context, a topology comprised of inner switches and outer switches will have the inner switches operating in tandem and being complementary to the operation of the outer switches. Where symmetry is not presently available, in some embodiments, symmetry can be established by retrofitting a circuit by adding symmetrical electrical parts around an axis of symmetry (e.g., transforming the non-symmetrical circuit into a symmetrical circuit and controlling it accordingly based on the various embodiments described herein). A controller circuit or control module is coupled to the switches to provide the switching control. To demonstrate this functionality, a derivation of the common-mode equivalent circuit model for the dual-inverter based single-phase charger is presented. The common-mode model allows for the understanding of leakage current issues in the circuit. the proposed modulation technique is demonstrated to eliminate the leakage current during the single-phase charging process.

The leakage current reduction/elimination is also demonstrated on the symmetrical half-bridge front-end DC fast charger based on the dual-inverter drivetrain. This novel topology is introduced and is shown in various embodiments to work with the proposed modulation approach to yield technical improvements. Due to non-idealities (e.g., non-perfectly matching components), the leakage current is significantly reduced and not eliminated in some cases.

A method for modulating common mode leakage current in an electrically symmetrical electric power circuit is described in an embodiment, the method including controlling a plurality of switches of the electrically symmetrical electric power circuit, such that one or more electrically symmetrical pairs of switches of the plurality of switches are operated at a same operational state when the power circuit is coupled to an electrical grid to reduce the common mode leakage current; wherein each switch of the one or more electrically symmetrical pairs of switches has a switched node that is connected by a symmetrical branch and are electrically symmetrical across a symmetry axis. The switches are controlled in accordance with modulation approaches described herein and are adapted to effectively minimizing the leakage current.

The symmetry axis can be defined around any electrical point that has equal or approximately equal impedance to the switched nodes of the electrically symmetrical pair of switches. There is typically one symmetry axis, and a controller circuit (or computing device) is used to couple mirrored switches to operate the switches in tandem, for example, by applying gating pulses to control the operation of the switches. The controller circuit can include electrical coupling to each of the switches, and on-board software or firmware can be configured to indicate coupled switches and to operate them accordingly. In some embodiments, the controller circuit receives as a data input identification information indicating which switches are coupled. This is particularly useful where a common controller circuit is used for a number of different underlying circuit topologies (e.g., where the number of switch pairs is not known ahead of implementation). In other implementations, the controller circuit can be a special purpose circuit designed for a particular topology having paired switch inputs that do not require coupled identifiers. In another practical implementation example, paired switches can be connected to the controller circuit through common nodes such that the paired switches receive the same gating pulses across the common nodes.

In some embodiments, the electrically symmetrical electric power circuit is free of galvanic isolation.

In some embodiments, all active electrical elements of the electrically symmetrical electric power circuit have symmetrical counterpart elements, the active electrical elements including at least one of voltage and current sources.

In some embodiments, the electrically symmetrical electric power circuit is a dual inverter drive.

In some embodiments, the dual inverter drive is a single phase charger that has two mirrored electrical pathways, each electrical pathway including an active rectifier stage, an energy storage device, and three inverter stages, each of the three inverter stages coupled to a symmetrical counterpart across an inductive winding.

In some embodiments, the active rectifier has a switch Shb1, and the switch Shb1 switches at a grid frequency of the electrical grid.

In some embodiments, corresponding switches of each of the three inverter stages is operated in tandem to have the same operational state, each of the three inverter stages operated at a grid frequency of the electrical grid.

In some embodiments, the active rectifier has a switch Shb1, and the switch Shb1 switches at the grid frequency of the electrical grid; and a center of an ON operational state of the switch Shb1 is synchronized relative to a center of at least one ON operational state correspond to at least one of the three inverter stages.

In some embodiments, the electrically symmetrical electric power circuit is a dual inverter based DC charger with a four switch symmetrical buck DC-DC front end.

In some embodiments, the electrically symmetrical electric power circuit includes an active rectifier having a switch Shb1, and the switch Shb1 is operated in an ON operational state.

In some embodiments, the electrically symmetrical electric power circuit includes three inverter stages, each of the three inverter stages coupled to a symmetrical counterpart across an inductive winding, and corresponding switches of each of the three inverter stages is operated in an OFF operational state.

In some embodiments, the electrically symmetrical electric power circuit includes an active rectifier having a switch Shb1.

In some embodiments, the electrically symmetrical electric power circuit includes three inverter stages, each of the three inverter stages coupled to a symmetrical counterpart across an inductive winding, and corresponding switches of each of the three inverter stages is operated in tandem to have the same operational state; and In some embodiments, the active rectifier has a switch Shb1, and the switch Shb1 switches at the grid frequency of the electrical grid; and a center of an ON operational state of the switch Shb1 is synchronized relative to a center of at least one ON operational state correspond to at least one of the three inverter stages.

In some embodiments, an electric circuit having a symmetrical topology and the electric circuit is provided, the circuit including a dual inverter based DC charger with a four switch symmetrical buck DC-DC front end, coupled to a symmetrical voltage source or an asymmetrical voltage source.

In some embodiments, the approach includes retrofitting a non-symmetrical non-galvanically isolated electric power circuit to provide the electrically symmetrical electric power circuit by mirroring electrical components to achieve electrical symmetry along an axis of electrical symmetry.

In some embodiments, the modulated common mode leakage current is sufficiently reduced such that a ground fault indicator is not triggered during charging.

In some embodiments, the electrically symmetrical electric power circuit is coupled to a portable charger or coupled to an electric drivetrain.

In some embodiments, the electric drivetrain is coupled to a vehicle, and the electric drivetrain provides drive functionality in a drive mode, and power flow capability in a stationary mode.

In some embodiments, the power flow capability is adapted for bi-directional power flow.

In some embodiments, the switch Shb1 has a complementary switch Shb2, and switching of the switch Shb1 and the switch Shb2 are synchronized such that positive pulses correspond temporally together and negative pulses correspond temporally together.

In some embodiments, the synchronization of the center of the least one ON operational states of the switch Shb1 and the at least one of the three inverter stages reduces an AC grid current ripple and total harmonic distortion.

In some embodiments, the AC grid current ripple and the total harmonic distortion are sufficiently reduced to meet minimum operating requirements for providing power to the electrical grid.

In some embodiments, the system provides power to the electrical grid from energy storage devices coupled to the electrically symmetrical electric power circuit.

In some embodiments, an electrically symmetrical electric power circuit is provided, the circuit including a controller circuit configured to control a plurality of switches of the electrically symmetrical electric power circuit, such that one or more electrically symmetrical pairs of switches of the plurality of switches are operated at a same operational state when the power circuit is coupled to an electrical grid to reduce the common mode leakage current; wherein each switch of the one or more electrically symmetrical pairs of switches has a switched node that is connected by a symmetrical branch and are electrically symmetrical across a symmetry axis; and wherein the symmetry axis is defined around any electrical point that has equal or approximately equal impedance to the switched nodes of the electrically symmetrical pair of switches.

In some embodiments, a controller circuit for controlling operation of an electrically symmetrical electric power circuit, is provided, the controller circuit including: a hardware processor configured to control a plurality of switches of the electrically symmetrical electric power circuit, such that one or more electrically symmetrical pairs of switches of the plurality of switches are operated at a same operational state when the power circuit is coupled to an electrical grid to reduce the common mode leakage current; wherein each switch of the one or more electrically symmetrical pairs of switches has a switched node that is connected by a symmetrical branch and are electrically symmetrical across a symmetry axis; and wherein the symmetry axis is defined around any electrical point that has equal or approximately equal impedance to the switched nodes of the electrically symmetrical pair of switches.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 11A, FIG. 11B, FIG. 11C, FIG. 11D illustrate gating signals used in conventional modulation.

FIG. 13A, FIG. 13B, FIG. 13C, FIG. 13D illustrate gating signals for a symmetrical bipolar modulation.

FIG. 15A, FIG. 15B, FIG. 15C, FIG. 15D illustrate gating signals that can be utilized for a proposed symmetrical unipolar modulation.

FIG. 17A and FIG. 17B illustrates a voltage harmonics profile.

DETAILED DESCRIPTION

Circuit solutions can be divided into galvanically isolated and non-isolated charging methods.

Figure 1:
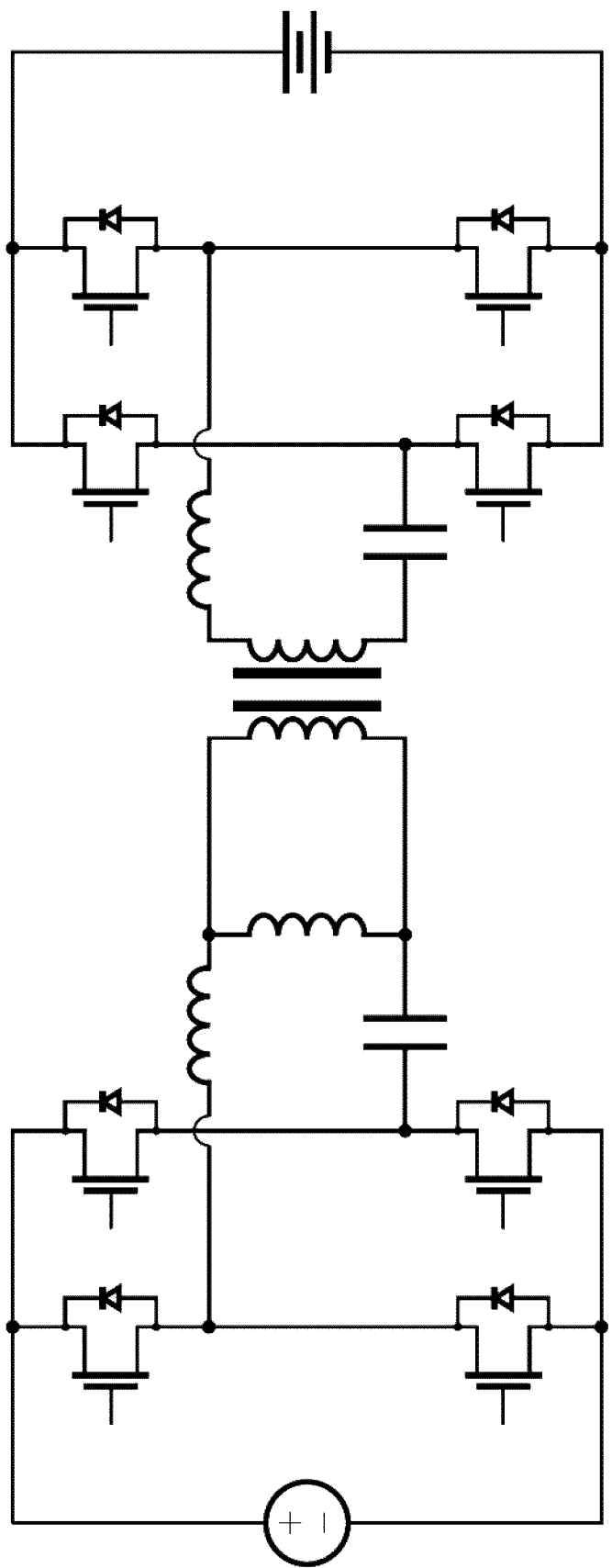
FIG. 1 is an example isolated charger, provided to illustrate an example where an additional conversion step is utilized that can impact efficiency.

Isolated chargers, such as the one presented in FIG. 1, include an isolation transformer at some point of the conversion, such that vehicle's battery is left floating with respect to ground. In this configuration the system becomes single-fault tolerant, i.e., no current flows in case only one point of contact is made to ground, for example through parasitic components. Additionally, isolated architectures, provide no common-mode leakage current path from the input, thereby easily preventing common-mode leakage current.

Many approaches recommend galvanic isolation for EV converter design, as seen in [2,3]. However, the presence of an isolation transformer includes at least one extra conversion step and requires magnetics rated to handle 100% of the charging voltage and current, resulting in a much lower system power density.

For onboard chargers, the added mass of transformers can negatively impact EV range, a critical priority for the application. Moreover, the additional conversion step significantly impacts efficiency. The main sources of loss include hysteresis, Eddy currents, and Joule effect. Mattsson et al. report losses equivalent to 1.5% of the power rating of the converter in [4]. Lastly, isolation has a considerable impact in the system's total component cost.

In contrast, non-isolated chargers do not employ a transformer, allowing more compact, efficient, and cheaper solutions. These characteristics make non-isolated architectures well suited for onboard charging applications and can significantly reduce charging infrastructure cost. Du et al. show a set of example non-isolated topologies used to implement municipal charging systems, achieving charging efficiency up to 98% [5]. In [6], Zhang et al. explain how the improved efficiency and power density of non-isolated chargers opens up opportunity for onboard integrated level 3 charging, greatly reducing infrastructure cost and providing a viable solution to range anxiety.

One such non-isolated topology is the integrated single-phase electric vehicle charging using a dual-inverter drive, proposed by Semsar et al. [7]. This topology leverages the circuit introduced in [8] and includes a front-end active rectifier. Being non-isolated, this technology has high power density and efficiency, while maintaining a lower cost than a comparable isolated solution. The system is shown in FIG. 2.

Figure 2:
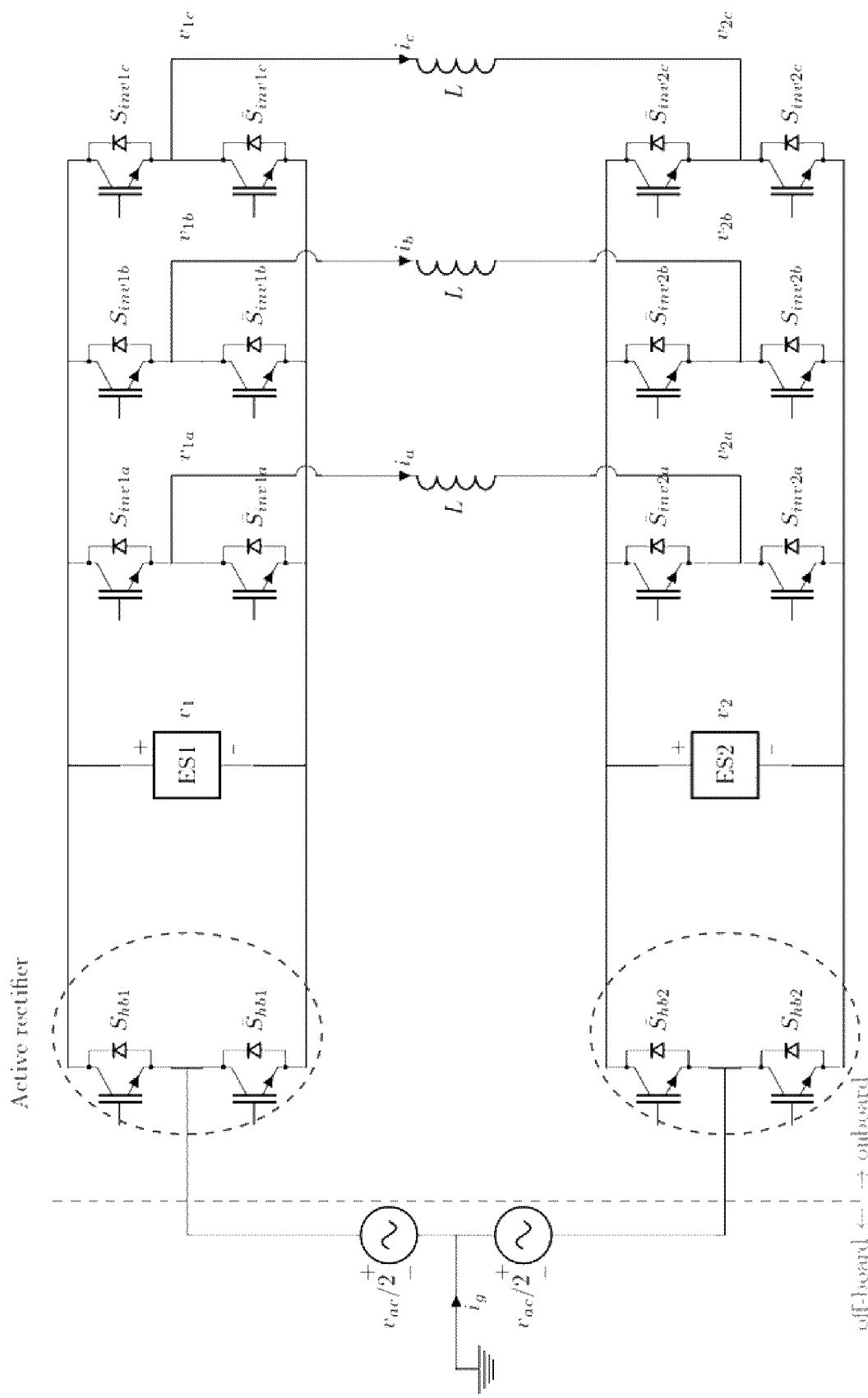
FIG. 2 is an example non-isolated charger, provided to illustrate an example circuit that can be used for onboard charging applications, despite challenges with leakage currents.

However, non-isolated chargers, such as the one presented in FIG. 2, have their unique set of challenges. Particularly, it is potentially harder to meet the safety standards regarding leakage current and electrical shock protection, since the lack of galvanic isolation provides a path for common-mode leakage current to flow.

The risk associated with the common-mode voltages generated during non-isolated power conversion are shown in [6,9]. Zhang et al. describe the issues specifically on the context of EV charging [6]. That paper proposes higher switching frequency and the addition of common-mode filters as safety challenges mitigation. However, both the higher switching frequency and the addition of common-mode filters have a significant negative impact on the efficiency, power density and cost of the overall system, thereby reducing the very advantages of non-isolated chargers.

Some alternative methods eliminate common-mode voltage and resulting common-mode current [10-12]. These solutions do not necessarily include additional magnetic circuitry such as common-mode chokes or galvanically isolated transformers. Instead, they focus on the topology's common-mode equivalent circuit, derived as described in [13]. The common-mode equivalent circuit can then facilitate the understanding of the source of all common-mode disturbances in the system and help the design of a solution to zero all such disturbances. A combination of switching strategies and differential-mode filter splitting (inductor splitting) can be utilized to solve the problem with no or negligible additional cost.

The solution described is suitable for converters that have an inherently symmetrical topology. The proposed approach consists of defining a central symmetry axis and simultaneously switching switches that are equidistant to the symmetry axis. In this context, a topology comprised of inner switches and outer switches will have the inner switches operating in tandem and being complementary to the operation of the outer switches. The approach can be provided by a controller circuit, which is coupled to switches of a symmetric, non-isolated circuit, and controls pairs of switches to operate in tandem. The controller circuit, in some embodiments, can include software or embedded firmware which controls gating signals for the switches. In an alternate embodiment, the controller circuit has electrical nodes which provide signals corresponding coupled switches.

To demonstrate the functionality, a derivation of the common-mode equivalent circuit model for the dual-inverter based single-phase charger shown in FIG. 2 is presented. The common-mode model allows for the understanding of leakage current issues in the circuit. the proposed modulation technique is demonstrated to eliminate the leakage current during the single-phase charging process.

The leakage current elimination is also demonstrated on the symmetrical half-bridge front-end DC fast charger based on the dual-inverter drivetrain. This novel topology is introduced and is shown to work with the proposed modulation approach.

A. Definitions

In this section, terms are defined. The following set of definitions is used to elaborate the expected claims of a potential patent arising from this invention disclosure.

Switched Node—Switched node refers to an electrical node connecting the positive terminal of a semiconductor switch to the negative terminal of another semiconductor switch.

Switched Pair—A pair of switches that connect to a switched node.

Symmetrical Branch—An electrical branch, with two terminals, that have equal impedance to ground when disconnected from the remaining of the circuit.

Symmetrical Pair of Switched Pairs—Two switched pairs whose switched nodes are connected by a symmetrical branch. In this case, each switched pairs is said to be symmetrical to the other.

Symmetry Axis—The symmetry axis of a topology is defined to include any electrical point that has equal impedance to the two switched nodes of any one symmetrical pair of switched pair, when all semiconductors in the topology are in open (OFF) state.

Symmetrical Pair of Switches—In a symmetrical pair of switched pairs, two switches are said to be symmetrical to one another when the first has its negative terminal connected to the switched node of one switched pair, while the other switch has its positive terminal connected to the switched node of the other switched pair. Such switches are said to be a symmetrical pair of switches.

Symmetrical Topology—A converter topology in which every switch is part of a symmetrical pair of switches, and every passive element, including impedances and short-circuits, is symmetrical with respect to the symmetry axis.

Symmetrical Topology, Including Sources—A symmetrical topology in which every active element, including voltage and current sources, is symmetrical with respect to the symmetry axis.

II. Common-Mode Model Derivation for Single-Phase Half-Bridge Front-End

To derive the common-mode equivalent circuit, the parasitic capacitances expected in the real system must be considered, as these components comprise the path for common-mode leakage current. For this purpose, one can assume y capacitors from both terminals of each battery to ground. The y capacitors are typically included in most automotive inverters to limit the common-mode voltage. Even if these components are not included by design, some parasitic capacitance will exist. Another set of capacitances is the winding-to-chassis capacitance. This path exists due to the proximity between the machine windings and the chassis.

Figure 3:
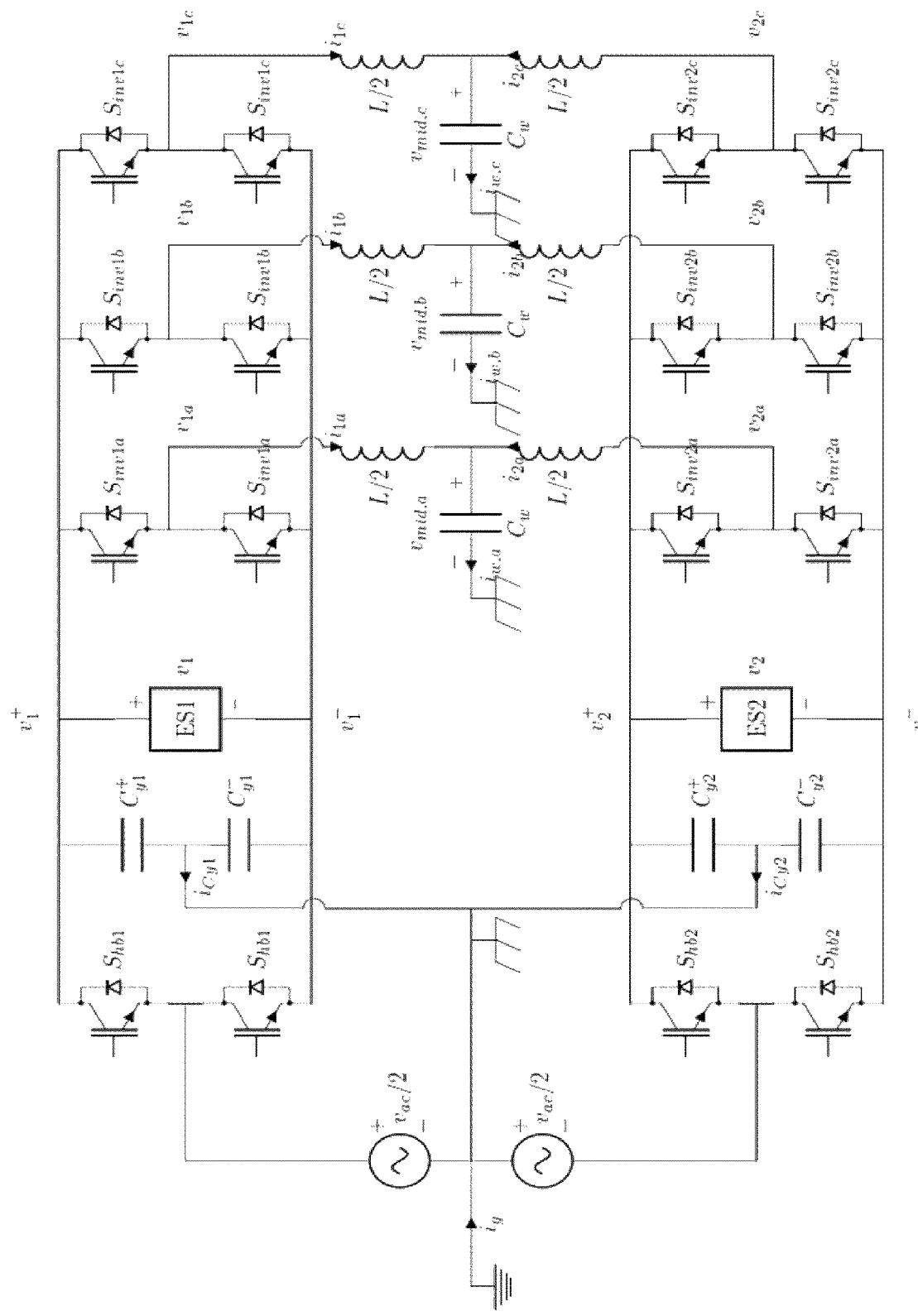
FIG. 3 is a circuit utilized for common-mode model derivations.

The resulting circuit is used for the common-mode model derivations and is shown in FIG. 3. FIG. 3 illustrates an integrated single-phase converter using dual-inverter drivetrain with included parasitic impedances.

Using the definition of presented on [13], the common-mode voltage between the top DC link and ground can be defined as $$v_{1,cm} = \frac{v_1^+ + v_1^-}{2}, \tag{1}$$

while the lower DC link common-mode voltage can be written as $$v_{2,cm} = \frac{v_2^+ + v_2^-}{2}. \tag{2}$$

In this context, the voltage between the positive rail of the top DC link and ground can be defined as $$v_1^+ = \begin{cases} \frac{v_{ac}}{2}, & \text{if } S_{hb1} = 1 \\ \frac{v_{ac}}{2} + v_1, & \text{if } S_{hb1} = 0 \end{cases}, \tag{3a}$$

while for the negative rail of the top DC link, $$v_1^- = \begin{cases} \frac{v_{ac}}{2} - v_1, & \text{if } S_{hb1} = 1 \\ \frac{v_{ac}}{2}, & \text{if } S_{hb1} = 0 \end{cases}. \tag{3b}$$

A similar analysis can be done for the bottom DC link, such that $$v_2^+ = \begin{cases} -\frac{v_{ac}}{2} + v_2, & \text{if } S_{hb2} = 1 \\ -\frac{v_{ac}}{2}, & \text{if } S_{hb2} = 0 \end{cases}, \tag{4a}$$

$$v_2^- = \begin{cases} -\frac{v_{ac}}{2}, & \text{if } S_{hb2} = 1 \\ -\frac{v_{ac}}{2} - v_2, & \text{if } S_{hb2} = 0 \end{cases}. \tag{4b}$$

Substituting (3) in (1), there is $$v_{1,cm} = \begin{cases} \frac{\frac{v_{ac}}{2} + \left(\frac{v_{ac}}{2} - v_1\right)}{2}, & \text{if } S_{hb1} = 1 \\ \frac{\left(\frac{v_{ac}}{2} + v_1\right) + \frac{v_{ac}}{2}}{2}, & \text{if } S_{hb1} = 0 \end{cases}. \tag{5}$$

It is therefore possible to write $v_{1,cm}$ as $$v_{1,cm} = \frac{v_{ac}}{2} + \frac{v_1}{2} - v_1 S_{hb1}, \tag{6}$$

where the common-mode voltage due to the switching of the AC front-end half-bridge rectifier can be defined as $$v_{hb1cm} = \frac{v_1}{2} - v_1 S_{hb1}, \tag{7}$$

and therefore, $$v_{1,cm} = \frac{v_{ac}}{2} + v_{hb1,cm}. \tag{8}$$

Substituting (4) in (2), there is $$v_{2,cm} = \begin{cases} \frac{-\frac{v_{ac}}{2} + \left(-\frac{v_{ac}}{2} + v_2\right)}{2}, & \text{if } S_{hb2} = 1 \\ \frac{\left(-\frac{v_{ac}}{2} - v_2\right) - \frac{v_{ac}}{2}}{2}, & \text{if } S_{hb2} = 0 \end{cases}. \tag{9}$$

It is therefore possible to write $v_{2,cm}$ as $$v_{2,cm} = -\frac{v_{ac}}{2} - \frac{v_2}{2} + v_2 S_{hb2}. \tag{10}$$

Similarly, to what was done for the top inverter, $$v_{hb2,cm} = -\frac{v_2}{2} + v_2 S_{hb2}, \tag{11}$$

and $$v_{2,cm} = -\frac{v_{ac}}{2} + v_{hb2,cm}. \tag{12}$$

The derivative of $v_{1,cm}$ can be written as $$\frac{dv_{1,cm}}{dt} = \frac{d}{dt}\left(\frac{v_1^+ + v_1^-}{2}\right) \tag{13}$$

$$\frac{dv_{1,cm}}{dt} = \frac{1}{2}\left(\frac{dv_1^+}{dt} + \frac{dv_1^-}{dt}\right).$$

The rail voltages are defined such that $v_1^+ = v_1^- + v_1$, therefore $$\frac{dv_1^+}{dt} = \frac{dv_1^-}{dt} + \frac{dv_1}{dt},$$

and given the slow changing voltage source characteristic of the battery, $$\frac{dv_1}{dt} \approx 0,$$

such that $$\frac{dv_1^+}{dt} = \frac{dv_1^-}{dt}. \tag{14}$$

Substituting (14) in (13), there is $$\frac{dv_{1,cm}}{dt} = \frac{1}{2}\left(\frac{dv_1^+}{dt} + \frac{dv_1^+}{dt}\right), \text{ or} \tag{15}$$

$$\frac{dv_{1,cm}}{dt} = \frac{dv_1^+}{dt} = \frac{dv_1^-}{dt}. \tag{16}$$

The current which flows through the chassis connection of the y capacitors on the DC link can be written as $$i_{Cy1} = C_{y1}^+ \frac{dv_1^+}{dt} + C_{y1}^- \frac{dv_1^-}{dt} \tag{17}$$

$$i_{Cy1} = C_{y1}^+ \frac{dv_{1,cm}}{dt} + C_{y1}^- \frac{dv_{1,cm}}{dt}$$

$$i_{Cy1} = \underbrace{(C_{y1}^+ + C_{y1}^-)}_{C_{y1}} \frac{dv_{1,cm}}{dt}.$$

Similarly, it can be shown that $$i_{Cy2} = \underbrace{(C_{y2}^+ + C_{y2}^-)}_{C_{y2}} \frac{dv_{2,cm}}{dt}. \tag{18}$$

On the motor side of the top inverter, the common mode voltage can be defined as $$v_{1,motor,cm} = \frac{v_{1a} + v_{1b} + v_{1c}}{3}, \tag{19}$$

where each of the phase voltage are defined with respect to ground.

Note that $$v_{1a} = v_1^- + S_{inv1a} v_1 \tag{20}$$

$$= v_1^- + \frac{v_1}{2} - \frac{v_1}{2} + S_{inv1a} v_1$$

$$= v_1^- + \frac{v_1^+}{2} - \frac{v_1^-}{2} - \frac{v_1}{2} + S_{inv1a} v_1$$

$$= \frac{v_1^+}{2} + \frac{v_1^-}{2} - \frac{v_1}{2} + S_{inv1a} v_1,$$

$$= v_{1,cm} - \frac{v_1}{2} + S_{inv1a} v_1,$$

which implies in $$v_{1a} = v_{1,cm} - \frac{v_1}{2} + S_{inv1a} v_1, \tag{21a}$$

$$v_{1b} = v_{1,cm} - \frac{v_1}{2} + S_{inv1b} v_1, \text{ and} \tag{21b}$$

$$v_{1c} = v_{1,cm} - \frac{v_1}{2} + S_{inv1c} v_1. \tag{21c}$$

Using (21), (19) can be written as $$v_{1,motor,cm} = v_{1,cm} + \left(-\frac{v_1}{2} + v_1 \frac{1}{3}\Sigma_{i=a}^{c} S_{inv1i}\right), \tag{22}$$

and one can define $$v_{inv1,ccm} = \left(-\frac{v_1}{2} + v_1 \frac{1}{3}\sum_{i=a}^{c} S_{inv1i}\right). \tag{23}$$

Analogously, $$v_{2,motor,cm} = v_{2,cm} + \frac{v_2}{2} - v_2 \frac{1}{3}\sum_{i=a}^{c} S_{inv2i}, \text{ and} \tag{24}$$

$$v_{inv2,ccm} = \frac{v_2}{2} - v_2 \frac{1}{3}\sum_{i=a}^{c} S_{inv2i}. \tag{25}$$

The motor impedance can be derived using the concepts presented in [13]. The result is equivalent to each of the three phases impedance connected in parallel. The proof is presented below.

The common mode current on the motor side of the top inverter, as defined in [13] can be written as:

$$\frac{L}{2}\frac{d}{dt}i_{1,motor,cm} = \frac{L}{2}\frac{d}{dt}i_{1a} + \frac{L}{2}\frac{d}{dt}i_{1b} + \frac{L}{2}\frac{d}{dt}i_{1c} \quad (26)$$

$$= (v_{1a} - v_{mid,a}) + (v_{1b} - v_{mid,b}) + (v_{1c} - v_{mid,c}), \text{ or}$$

$$\frac{L}{6}\frac{d}{dt}i_{1,motor,cm} = (v_{1,motor,cm} - v_{mid,cm}),$$

and similarly $$\frac{L}{6}\frac{d}{dt}i_{2,motor,cm} = \frac{d}{dt}(v_{2,motor,cm} - v_{mid,cm}). \quad (27)$$

The leakage current through the windings parasitic capacitance can be written as $$i_{w,cm} = i_{w,a} + i_{w,b} + i_{w,c} \quad (28)$$

$$i_{w,cm} = C_w\frac{d}{dt}v_{mid,a} + C_w\frac{d}{dt}v_{mid,b} + C_w\frac{d}{dt}v_{mid,c}$$

$$i_{w,cm} = 3C_w\frac{d}{dt}v_{mid,cm}, \text{ where}$$

$$v_{mid,cm} = \frac{v_{mid,a} + v_{mid,b} + v_{mid,c}}{3}. \quad (29)$$

Figure 4:
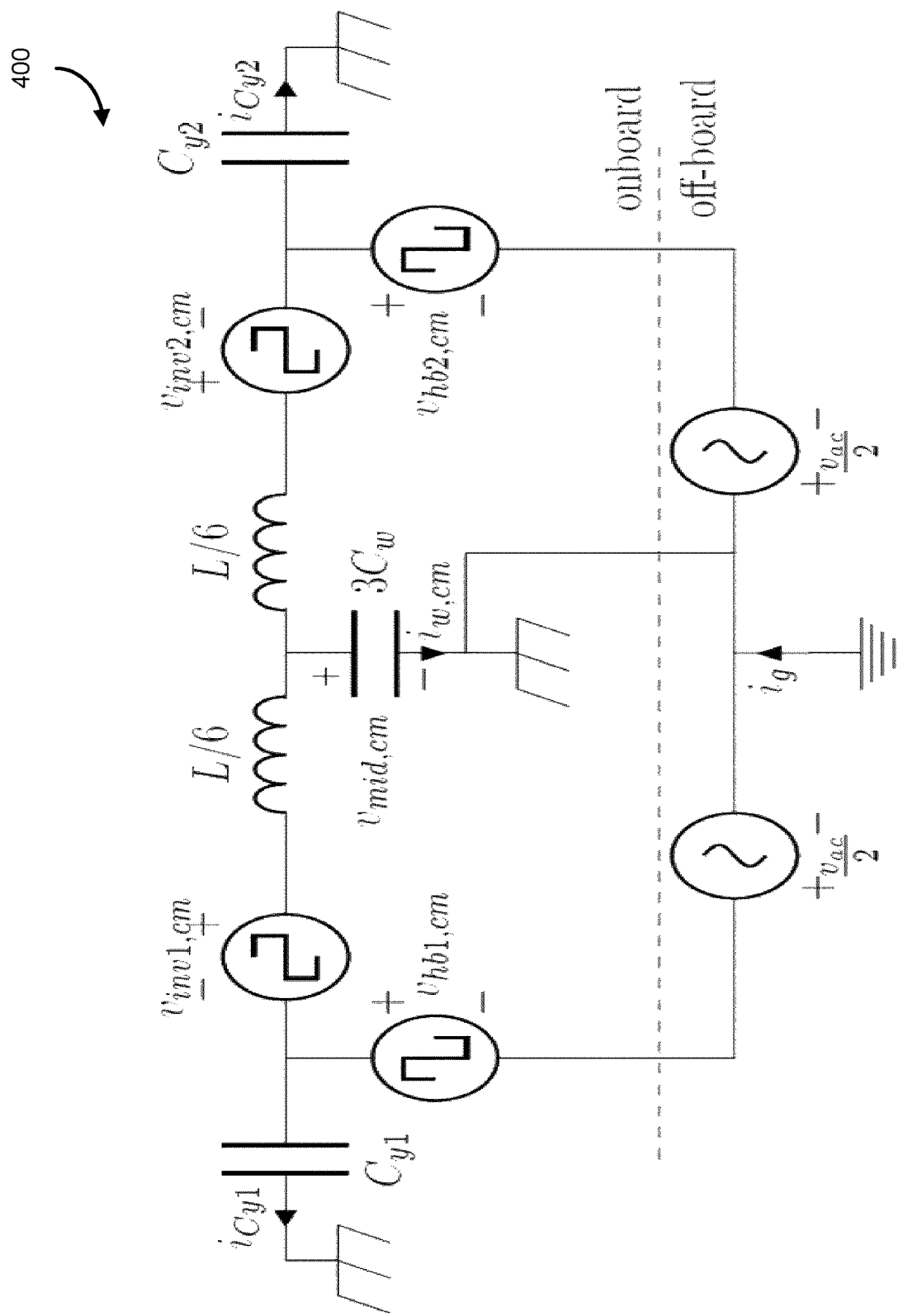
FIG. 4 illustrates a dual-inverter common mode equivalent circuit as seen by the motor.

Using equations (8), (12), (17), (18), (23), (25), (26), (27), and (28), it is possible to express the system as shown in FIG. 4. FIG. 4 illustrates a dual-inverter common mode equivalent circuit 400 as seen by the motor.

The leakage current, which flows to the ground of the ac circuit can be defined as $$i_g = (i_{Cy1} + i_{Cy2}) + i_{w,cm}. \quad (30)$$

The circuit presented in FIG. 4 represents the 0-sequence circuit, i.e., the common-mode equivalent circuit of the machine and inverter set. However, a second common mode transformation can be applied using the same method. The result allows to arrive at the common-mode model as seen by the grid, which allows us to see the effects of leakage current. This derivation, for simplicity, is based on $$C_{y1} = C_{y2} = \frac{1}{2}C_y. \quad (31)$$

Figure 5:
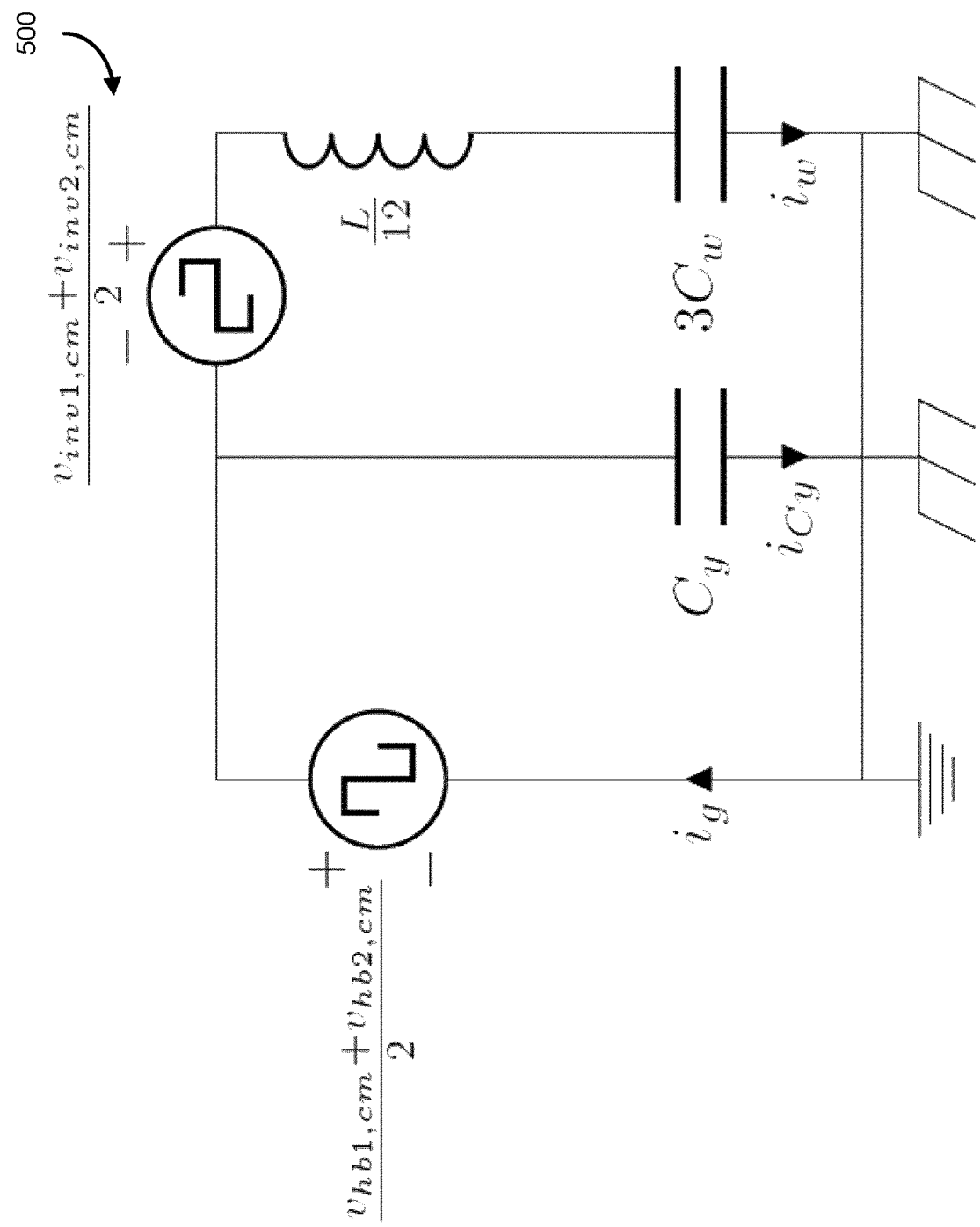
FIG. 5 shows a dual-inverter common mode equivalent as seen by the grid.

FIG. 5 presents the equivalent model. FIG. 5 shows a dual-inverter common mode equivalent as seen by the grid.

III. Common-Mode Leakage Current Elimination

From equation (30), it is possible to see that if $(i_{Cy1}+i_{Cy2})=0$ and $i_{w,cm}=0$, $i_g=0$. The following set of conditions is sufficient to zero the leakage:

$$v_1 = v_2, \quad (32a)$$

$$S_{hb1} = S_{hb2}, \quad (32b)$$

and $$\sum_{i=a}^{c} S_{inv1i} = \sum_{i=a}^{c} S_{inv2i}. \quad (32c)$$

The reason behind this operation can be found by evaluating the voltage sources which drive the circuit shown in (5) under the conditions outlined in (32). The component dependent on the switching state of the front-end half-bridge can be determined as:

$$\frac{v_{hb1,cm} + v_{hb2,cm}}{2} = \frac{1}{2}\left(\frac{v_{b1}}{2} - v_{b1}S_{hb1} - \frac{v_{b2}}{2} + v_{b2}S_{hb2}\right). \quad (33)$$

Substituting conditions (32a) and (32b) into 33 leads to $$\frac{v_{hb1,cm} + v_{hb2,cm}}{2} = \frac{1}{2}\left(\frac{v_{b1}}{2} - v_{b1}S_{hb1} - \frac{v_{b2}}{2} + v_{b2}S_{hb2}\right) = 0. \quad (34)$$

The component dependent on the inverter can be calculated as $$\frac{v_{inv1,cm} + v_{inv2,cm}}{2} = \frac{1}{2}\left(-\frac{v_{b1}}{2} - v_{b1}\frac{1}{3}\sum_{i=a}^{c} S_{inv1i} + \frac{v_{b2}}{2} + v_{b2}\frac{1}{3}\sum_{i=a}^{c} S_{inv2i}\right). \quad (35)$$

Substituting conditions (32a) and (32c) into 35 leads to $$\frac{v_{inv1,cm} + v_{inv2,cm}}{2} = \quad (36)$$

$$\frac{1}{2}\left(-\frac{v_{b1}}{2} - v_{b1}\frac{1}{3}\sum_{i=a}^{c} S_{inv1i} + \frac{v_{b2}}{2} + v_{b2}\frac{1}{3}\sum_{i=a}^{c} S_{inv2i}\right) = 0.$$

As all voltages are cancelled, no common-mode leakage current flows through the grid.

A. Charge Balancing and Imbalance Sensitivity

It is important to notice that the condition imposed by (32b) does not allow for charge balancing during the charging operation, while the condition (32a) assumes perfect charge balance. To design an operation which accommodates both of these constraints, it is possible to allocate the charge balancing to the driving cycle. Using this operation paradigm, any charge imbalance that may arise are eliminated during the driving operation. Consequently, at the beginning of the charging process, the voltages of both ES's are balanced, and the system can charge without leakage current issues.

The reason for this choice, is that when driving, the system is by nature galvanic isolated from the grid, as no wired connection is present. Therefore, leakage current is not possible, and the conditions outlined in (32) are not necessary.

Small imbalances can still arise during the charging operation due to variability caused by battery degradation. However, these imbalances are expected to be very small. To understand the effects of small imbalances on leakage current, it is possible to use the circuit developed in FIG. 5. The voltages which drive the common-mode leakage current can be evaluated under the conditions that the switching is performed as prescribed in (32b) and (32c), there may be some nonzero mismatch in voltages $$\Delta v = v_1 - v_2. \quad (37)$$

To calculate the voltages driving leakage current it is possible to use equations (8) and (12)

$$\frac{v_{1,cm} + v_{2,cm}}{2} = \frac{\frac{v_{ac}}{2} + \frac{v_1}{2} - v_1 S_{hb1} + \left(-\frac{v_{ac}}{2} - \frac{v_2}{2} + v_2 S_{hb2}\right)}{2}. \quad (38)$$

Substituting (32b) in (38), and cancelling the terms related to the ac grid voltage, $$\frac{v_{1,cm} + v_{2,cm}}{2} = \left(\frac{1}{2} - S_{hb1}\right)\left(\frac{v_1 - v_2}{2}\right) = \frac{1}{2}\left(\frac{1}{2} - S_{hb1}\right)\Delta v. \quad (39)$$

Notice that the term $$\frac{1}{2}\left(\frac{1}{2} - S_{hb1}\right)$$

is limited by $$\left|\frac{1}{2}\left(\frac{1}{2} - S_{hb1}\right)\right| = \frac{1}{4}, \quad (40)$$

and hence the voltage has magnitude of $$\frac{1}{4}\Delta v.$$

Small variations of voltages cause small common-mode voltages thereby causing negligible leakage currents.

The same calculation can be performed to $$\frac{v_{inv1,cm} + v_{inv2,cm}}{2} = \frac{\left(\frac{-v_1}{2} + v_1 \frac{1}{3}\sum_{i=a}^{c} S_{inv1i}\right) + \left(\frac{v_2}{2} - v_2 \frac{1}{3}\sum_{i=a}^{c} S_{inv2i}\right)}{2}, \quad (41)$$

which, under (32c) is equivalent to $$\frac{v_{inv1,cm} + v_{inv2,cm}}{2} = \frac{1}{2}\left(\sum_{i=a}^{c} S_{inv1i} - \frac{1}{2}\right)\Delta v. \quad (42)$$

Notice that $$\left|\frac{1}{2}\left(\sum_{i=a}^{c} S_{inv1i} - \frac{1}{2}\right)\right| \le \frac{1}{4} \quad (43)$$

limits the magnitude of the voltages generated by ES voltage mismatches.

IV. Ripple Minimization

Figure 6:
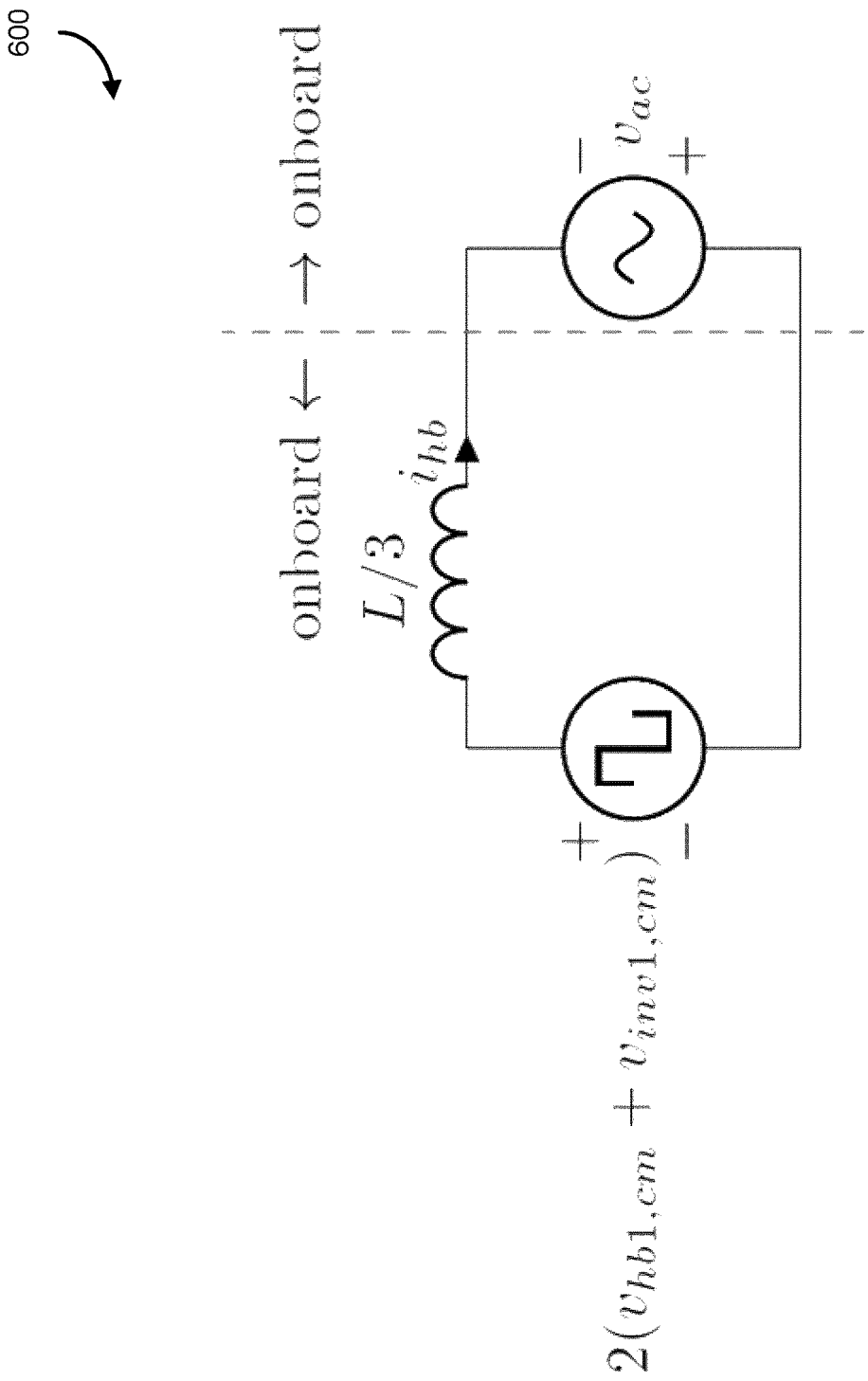
FIG. 6 illustrates a simplified common-mode equivalent circuit as seen by the motor while using symmetrical modulation.

The technique described in conditions (32) leads to $v_{inv1,cm}=v_{inv2,cm}$ and $v_{hb1,cm}=v_{hb2,cm}$. Furthermore, as the leakage current is eliminated, the leakage paths can be neglected. As a result, the system shown in FIG. 4 can be simplified as shown in FIG. 6. FIG. 6 illustrates a simplified common-mode equivalent circuit 600 as seen by the motor while using symmetrical modulation.

The basic operation of this system, includes controlling the voltage source 2 ($v_{hb1,cm}+v_{inv1,cm}$) to enforce a desired current.

Note that:

$$2(v_{hb1,cm} + v_{inv1,cm}) = v_1\left(\frac{1}{3}\sum_{i=a}^{c} S_{inv1i} - S_{hb1}\right), \quad (44)$$

where $S_{inv1a}$, $S_{inv1b}$, $S_{inv1c}$, and $S_{hb1}$ are modulated to producing a grid frequency voltage to the effect of control the current $i_{hb}$. However, these voltage sources have a strong component in the switching frequency.

To mitigate the effect of these components can have on the charging current $i_{hb}$, the following set of rules is proposed in addition to (32):

$$S_{inv1a}=S_{inv1b}=S_{inv1c}=S_{inv1}, \quad (45a)$$

$$f_{sw,inv}=f_{sw,hb}, \quad (45b)$$

and $$\delta=0, \quad (45c)$$

where $f_{sw,inv}$ is the switching frequency of the inverter, $f_{sw,hb}$ is the switching frequency of the half-bridge ac front-end interface, and $\delta$ is defined to be the phase-shift between the triangular carrier waves used to generate the gating signals used in the system.

When the conditions (45) are met, voltage produced is:

$$2(v_{hb1,cm}+v_{inv1,cm})=v_1(S_{inv1}-S_{hb1}), \quad (45d)$$

where the gating signals $S_{inv1}$ and $S_{hb1}$ are generated using unipolar PWM. As a result, the dominant, first harmonic of the switching frequency voltage distortion are eliminated, and the resulting current has a reduced ripple and THD distortion.

This allows the converter to meet grid connected standards, which can require THD <5% while minimizing conduction losses in the system.

V. Symmetrical Half-Bridge Front-End Dc Fast-Charger

Following the same symmetry principles, it is possible to design a DC/DC front-end for a dual inverter based EV DC fast charger. The resulting topology is shown in FIG. 7 and combines the symmetrical buck front-end, similar to shown in [12], to the dual inverter to implement a symmetrical noninverting buck-boost. The novelty of this topology consists of the inclusion of an extra switch allows for the insertion of capacitors to stabilize the blocked voltage and allow for voltage blocking limitation.

As a result, the switches used in the construction of this topology only need to be rated for $v_{dc}/2$, as opposed to $v_{dc}$, as it is the case in the topology shown in [12].

Figure 7A:
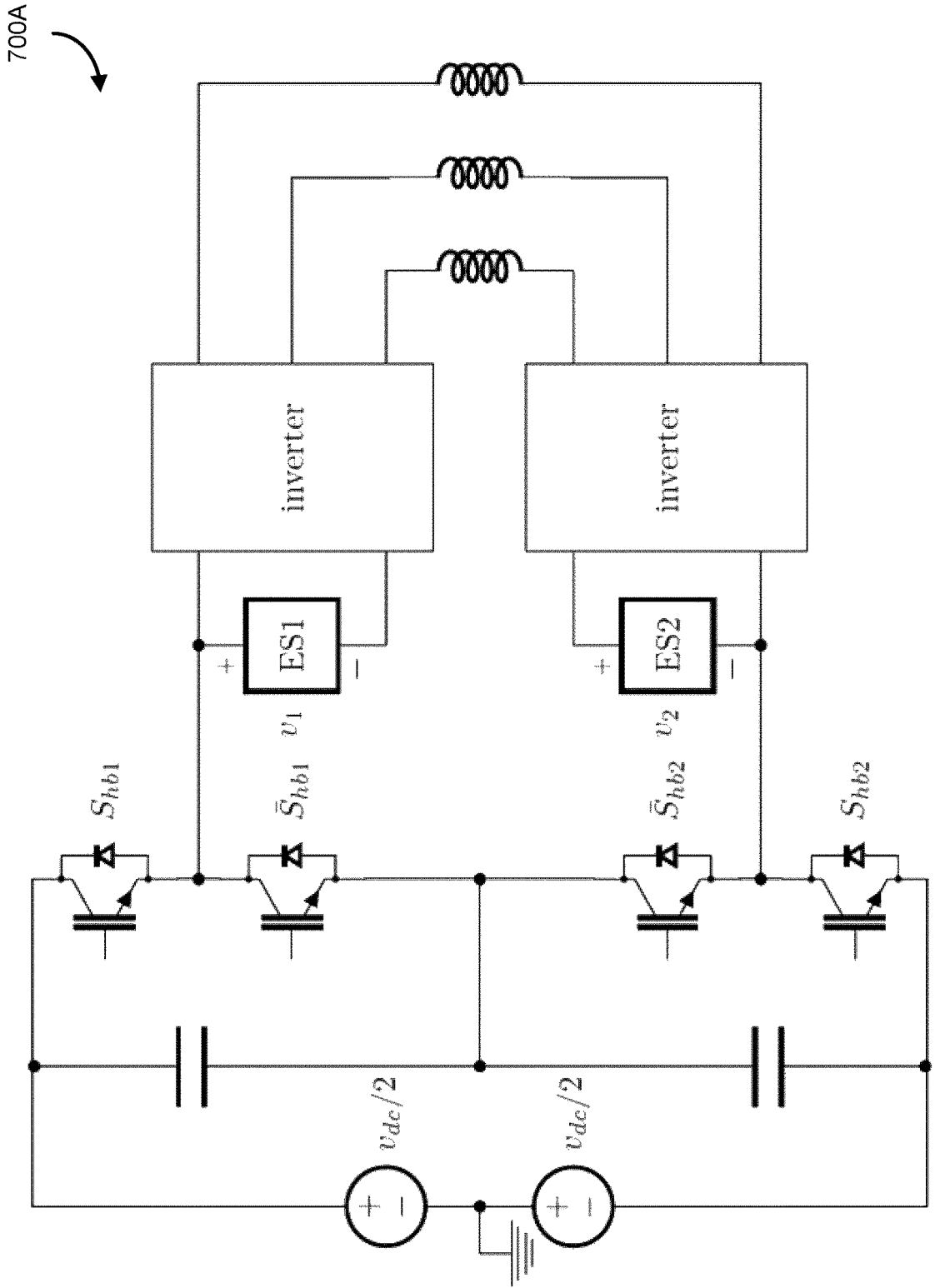
FIG. 7A and FIG. 7B illustrate a dual-inverter based DC fast-charger with 4 switch symmetrical buck DC-DC front-end.
Figure 7B:
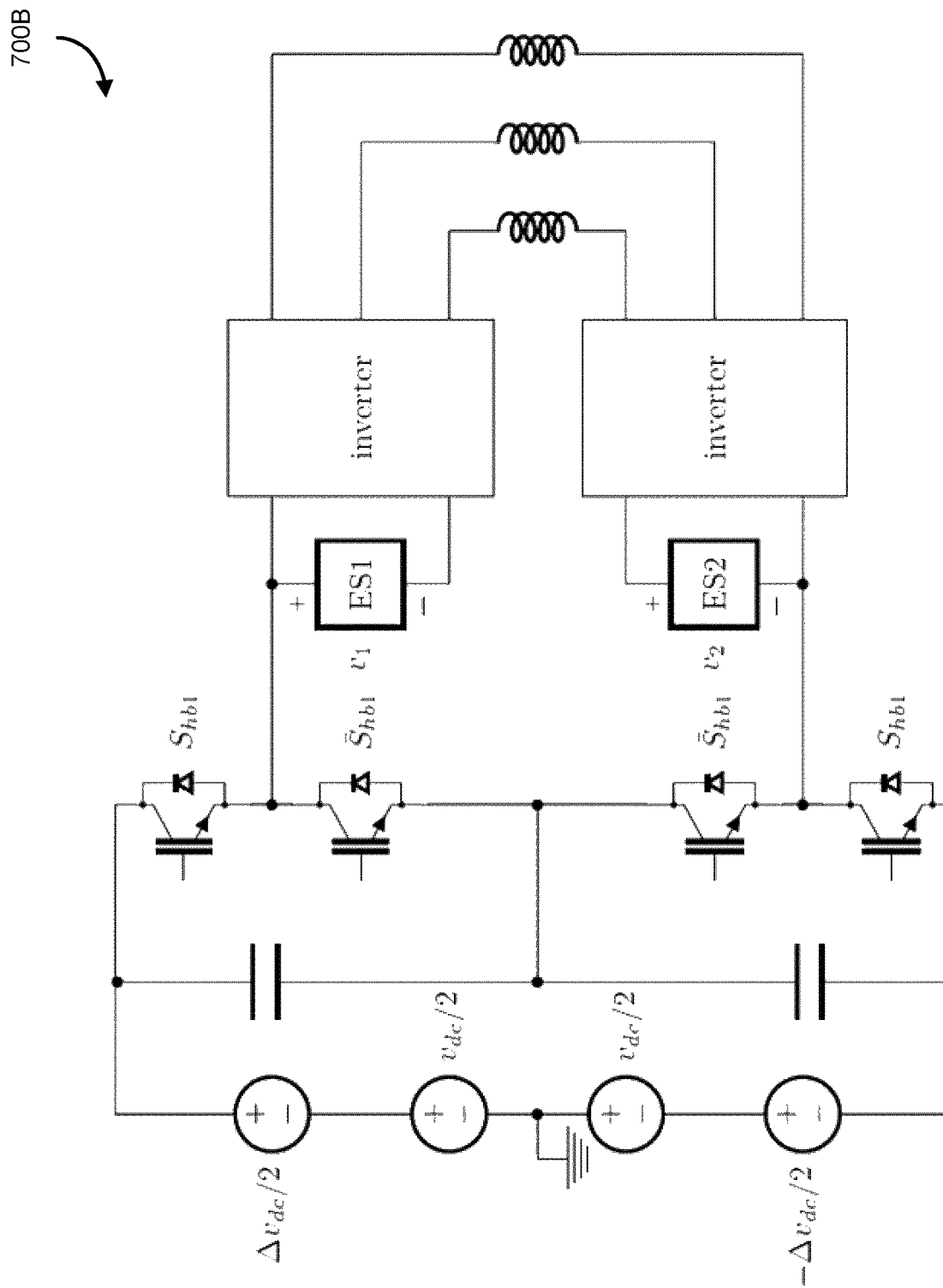

FIG. 7A and FIG. 7B illustrates a dual-inverter based DC fast-charger with 4 switch symmetrical buck DC-DC front-end, shown as 700A and 700B.

It is noticeable that the topology is symmetrical about the ground. As a result, the circuit shown in FIG. 7A and FIG. 7B can produce zero common-mode voltage and therefore zero common-mode leakage current in the presence of parasitic capacitances similar to shown in FIG. 3.

Furthermore, the converter can be connected to a non-symmetrical voltage source, as shown in FIGS. 7A and 7B and modulated as described above. The DC asymmetry does not generate any common-mode leakage current. The reason is that the leakage path is closed through a capacitor and the parasitic capacitance will behave like an open for the DC voltage, thereby ensuring zero current. In FIG. 7B, an asymmetrical voltage source is shown. Delta vdc is the voltage difference between batteries, whereas vdc is the average voltage.

As noted earlier, theoretically, under perfect conditions, the system produces exactly 0 leakage current. Here, Applicants expand this argument to demonstrate that even in the present of non-ideal conditions (such as battery voltage mismatch), the system still produces a low leakage current. The intention is to illustrate that the system will work in experimental and commercial settings, where perfect conditions, such as perfect battery voltage match is impractical.

Figure 8:
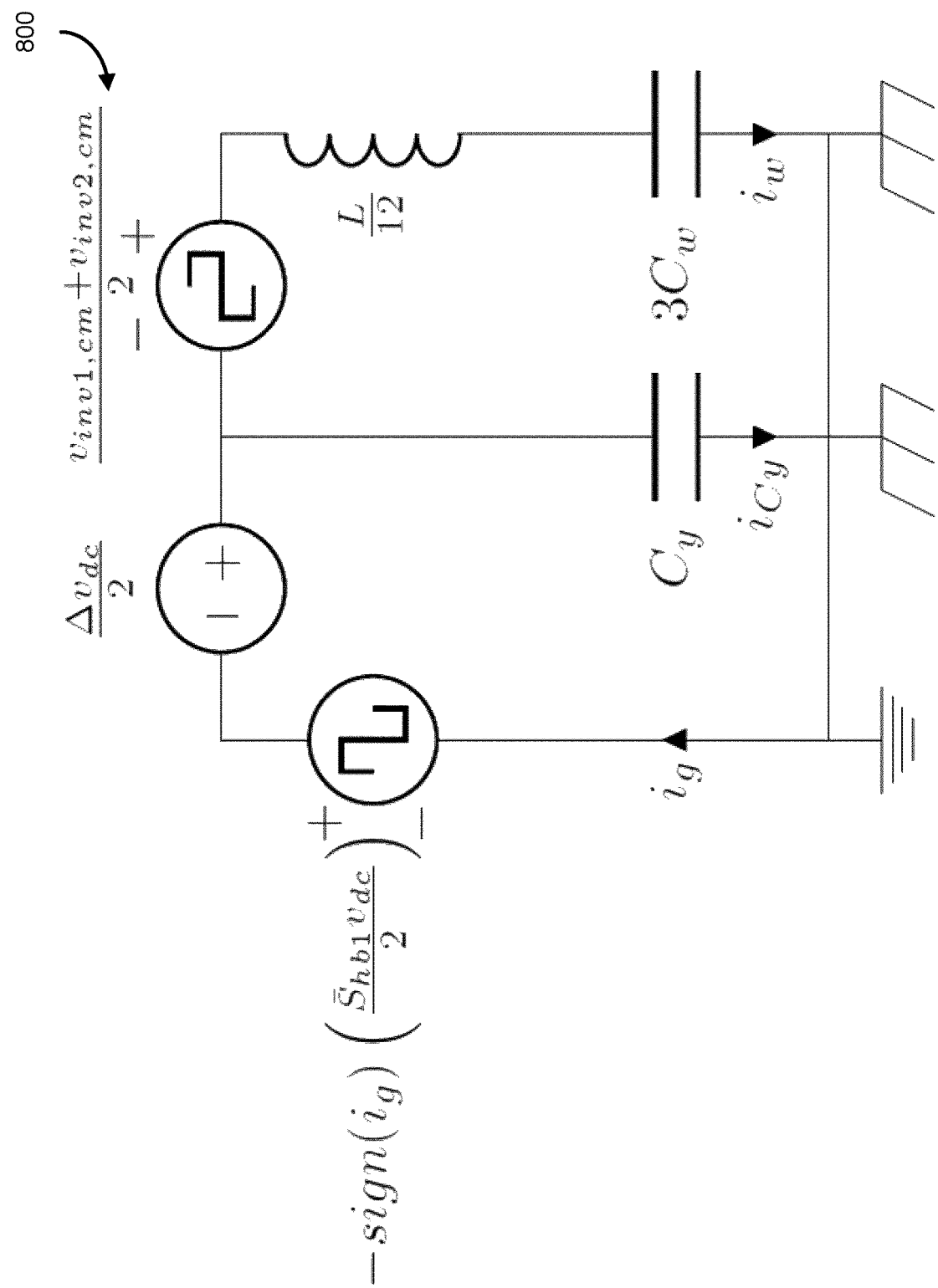
FIG. 8 illustrates a dual-inverter common-mode equivalent as seen by the DC input.

The common-mode equivalent circuit, as seen by the DC input can be derived including the parasitic capacitances and using a method similar to what was used for the rectifier front-end driven circuit. The circuit 800 is shown in FIG. 8. The common-mode model shown in this circuit includes 2 common-mode voltage sources in addition to the common-mode voltage generated to by the dual inverter.

Both of these voltages do not generate common-mode current. The DC voltage $\Delta v_{dc}/2$ does not generate current due to the presence of capacitors in the current path, as mentioned above. The voltage $$-\text{sign}(i_g)\left(\frac{\overline{S}_{hb1}v_{dc}}{2}\right)$$

is always in the direction of decreasing the current $i_g$. Therefore, the superposition of these two effects, will also not generate any common-mode leakage current.

In the presence of battery voltage mismatch, the common-mode leakage current generated is expected to be very small due to the effect described in (42). The common-mode voltage generated is limited to a quarter of the battery voltage mismatch, therefore being limited to a value several orders of magnitude lesser than the sum of the battery voltages.

FIG. 8 illustrates a dual-inverter common-mode equivalent as seen by the DC input.

An additional feature of this system is that the switches can be used to block current if either side has zero voltage. This is due to the non-inverting buck-boost nature of the system.

VI. Implementation

For the dual-inverter drive based single-phase charger, a proposed modulation approach is described that results in $$S_{inv1a}=S_{inv2a}, \tag{46a}$$

$$S_{inv1b}=S_{inv2b}, \tag{46b}$$

$$S_{inv1c}=S_{inv2c}, \tag{46c}$$

and $$S_{hb1}=S_{hb2}. \tag{46d}$$

Similarly, for the dual-inverter drive based DC fast charger, a modulation approach is provided that results in:

$$S_{inv1a}=S_{inv2a}, \tag{47a}$$

$$S_{inv1b}=S_{inv2b}, \tag{47b}$$

$$S_{inv1c}=S_{inv2c}, \tag{47c}$$

and $$S_{hb1}=S_{hb2}. \tag{47d}$$

While there are several ways of achieving the operating methods described above, this section presents some sample implementations and state the benefits achieved by each one. This list is not exhaustive, and it is expected that several methods exist to implement the gating pulse wave set described in various embodiments herein.

Figure 9A:
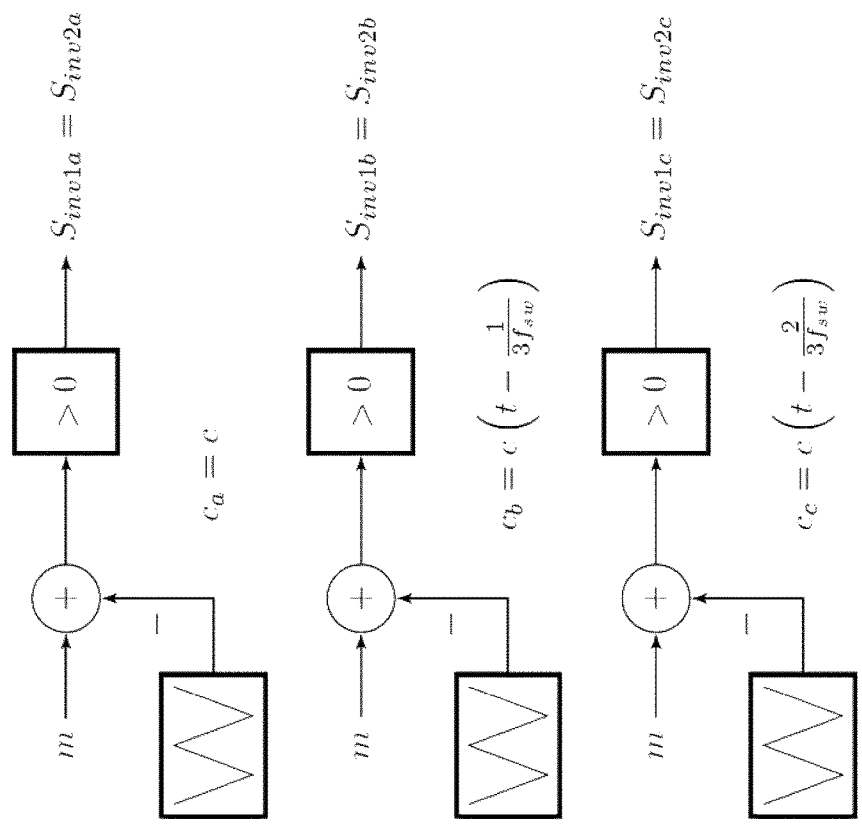
FIG. 9A, FIG. 9B, FIG. 9C illustrate sample modulation techniques for dual-inverter drive based single-phase charger.
Figure 9B:
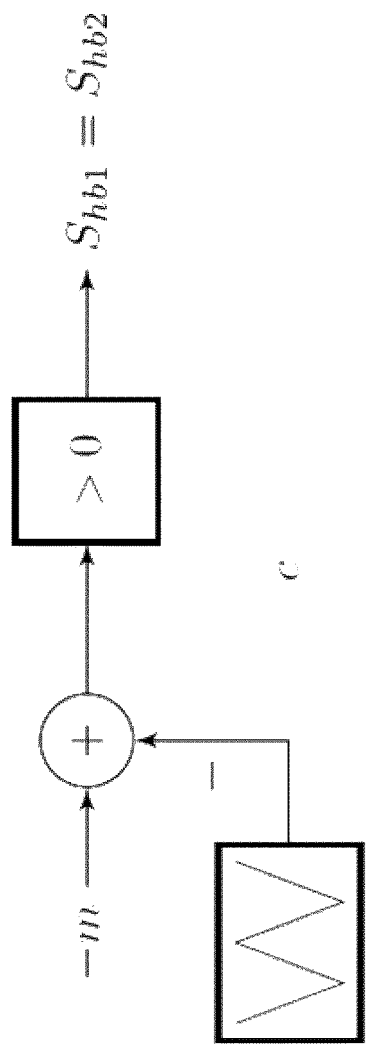
Figure 9C:
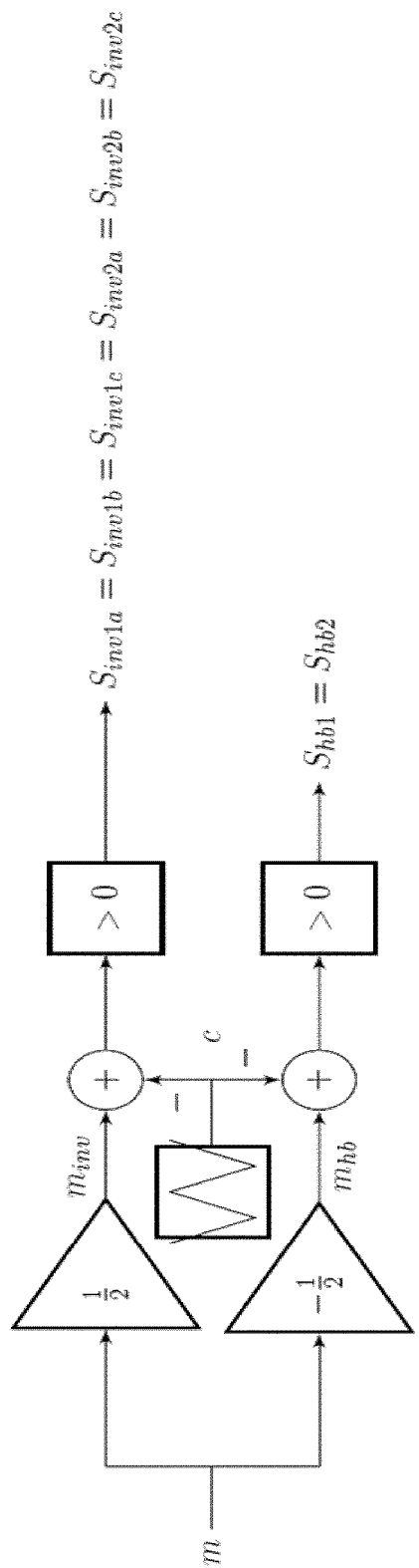

The sample modulators are presented in FIGS. 9A-9C for the single-phase case. In FIGS. 9A-9C, the method consists of using the desired modulation index, and the grid voltages, and generating a symmetrical set of gating pulses. In this context, the carrier c(t), is expected to be a number between −1 and 1.

Figure 10A:
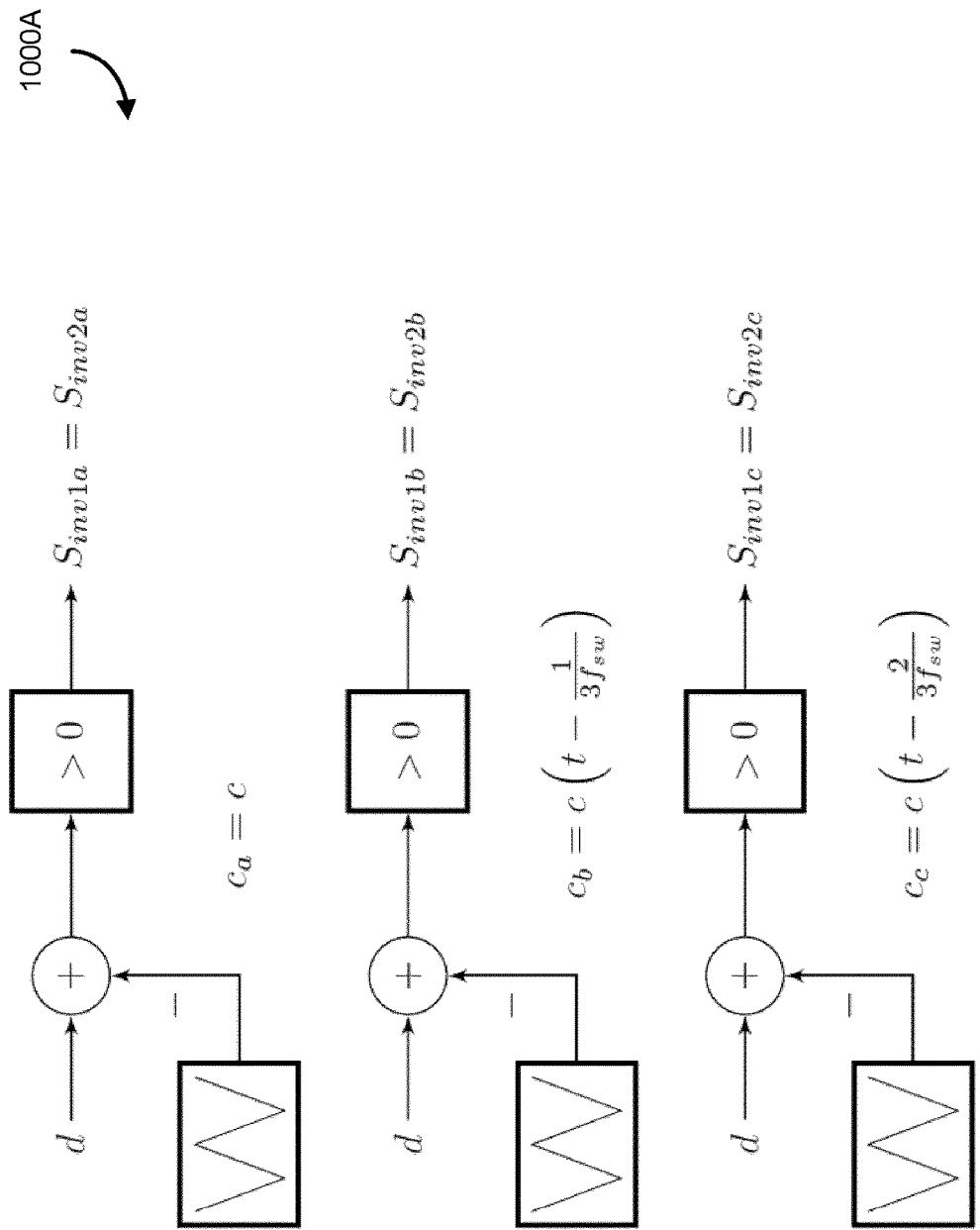
FIG. 10A, FIG. 10B, FIG. 10C illustrate sample modulation techniques for dual-inverter drive based DC fast charger.
Figure 10B:
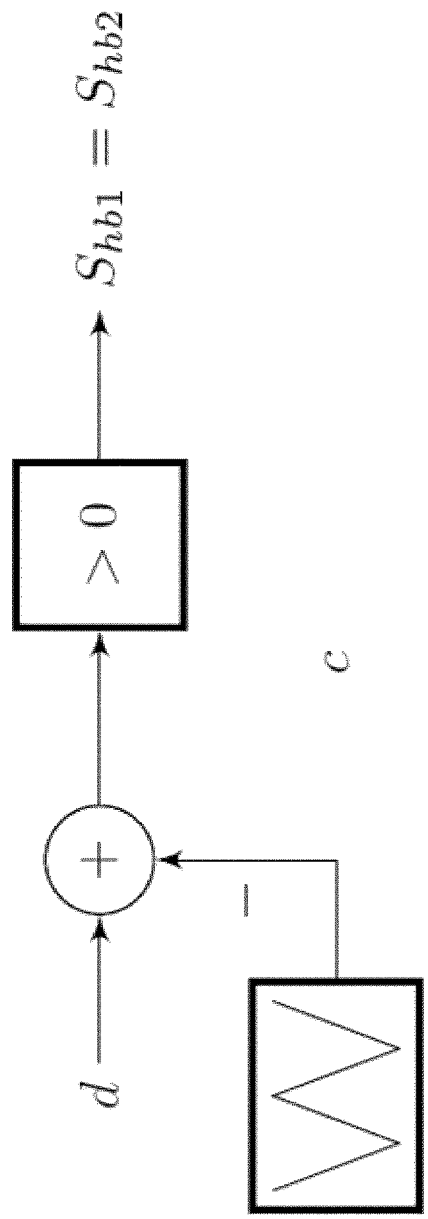
Figure 10C:
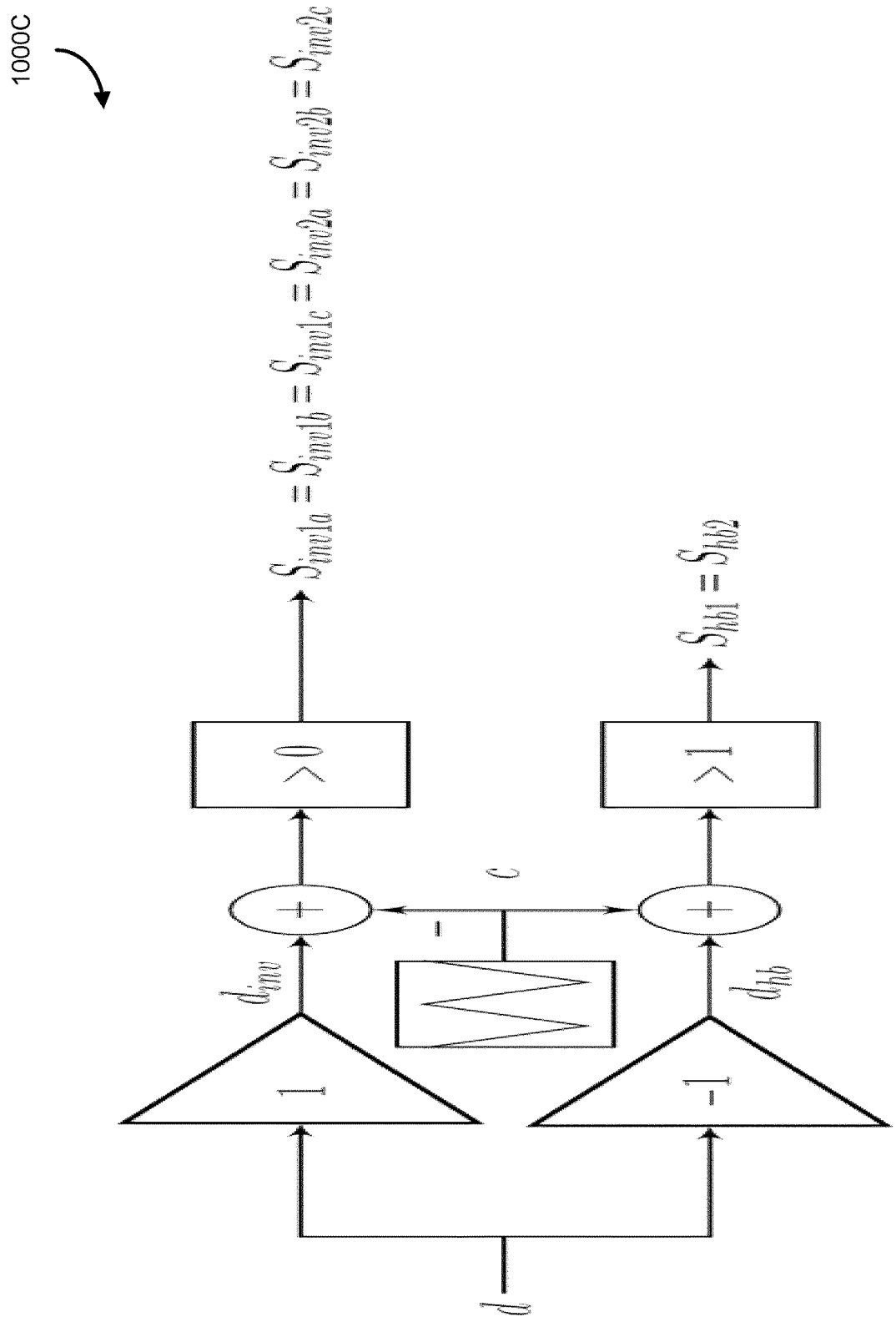
Figure 11A:
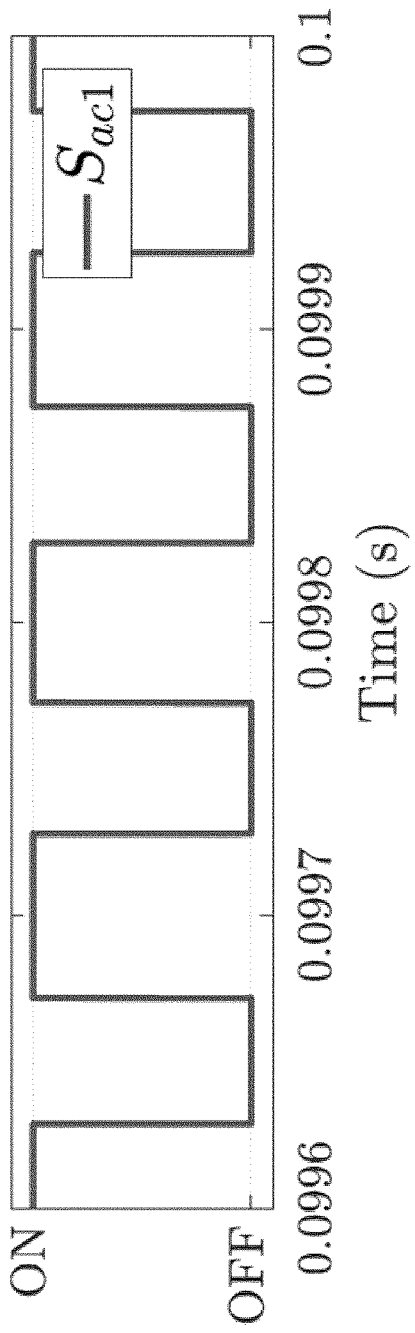
Figure 11B:
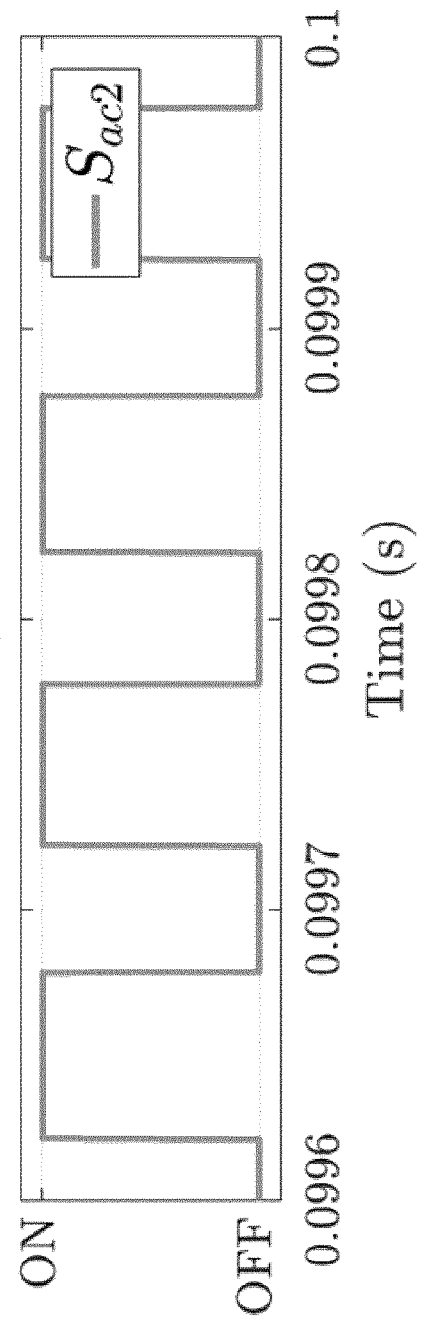

The sample modulators are presented in FIGS. 10A-10C for the DC fast charger case. In FIGS. 10A-10C, the method consists of using the desired duty cycle signal and generating a symmetrical set of gating pulses. In this context, the carrier c(t), is expected to be a number between 0 and 1.

FIG. 9A, FIG. 9B, FIG. 9C illustrate sample modulation techniques for dual-inverter drive based single-phase charger. FIG. 9A is an example modulation technique 900A showing improved grid THD, FIG. 9B is an example modulation technique 900B showing reduced switching losses associated with the inverter, and FIG. 9C is an example modulation technique 900C showing minimum grid THD, according to some embodiments.

The approach referred in FIG. 9A reduces switching frequency and therefore switching losses at the front-end stage, since the frond-end half-bridge is switched at grid frequency. Moreover, it applies a phase-shift between the motor phases. This technique, in some cases, may significantly decrease the amount of current ripple going through the electrical machine.

The approach referred in FIG. 9B, describes a case wherein the inverter switches are switched at grid frequency, thereby reducing the switching action and decreasing switching losses. This approach produces significantly higher conduction losses.

The approach described in FIG. 9C has the most switching losses. It can be described as both switching stages switching at the switching frequency. The front-end and back-end stages are phase-shifted as to cancel the voltage harmonics applied to the machine inductances at the switching frequency and odd multiples. In some cases, this strategy may result in lower machine phase current ripple than strategy FIG. 9A (especially when the machine has a high leakage inductance compared to d and q axis inductances), whereas in some other case it may generate higher current ripple.

FIG. 10A, FIG. 10B, FIG. 10C illustrate sample modulation techniques for dual-inverter drive based DCDC fast charger. FIG. 10A is an example showing improved grid THD, FIG. 10B is an example showing reduced switching losses, and FIG. 10C is an example showing minimum grid THD, according to some embodiments.

The approach referred in FIG. 10A does not switch the front-end stage, continuously keeping the outer switches of the front-end half bridges on at all times. Moreover, it applies a phase-shift between the motor phases. This technique, in some cases, may significantly decrease the amount of current ripple going through the electrical machine.

The approach referred in FIG. 10B, describes a case wherein the inverter switches are not switched. This approach produces significantly higher conduction losses.

The approach described in FIG. 10C has the most switching losses. It can be described as both switching stages switching at the switching frequency. The front-end and back-end stages are phase-shifted as to cancel the voltage harmonics applied to the machine inductances at the switching frequency and odd multiples.

In some cases, this strategy may result in lower machine phase current ripple than strategy FIG. 10A (especially when the machine has a high leakage inductance compared to d and q axis inductances), whereas in some other case it may generate higher current ripple.

VII. Simulations

A. AC Front-End Circuit

The system depicted in FIG. 3 is simulated using the parameters shown in Table 1.

TABLE 1

Parameters used in simulation.

| Parameter | Description | Value | |
|---|---|---|---|
| $v_{ac}$ | Grid Voltage | 120 | $V_{RMS}$ |
| $L_{hb}$ | AC Grid Equivalent Inductance | 10 | µH |
| $t'_1$ | Top ES Voltage | 200 | V |
| $t'_2$ | Bottom ES Voltage | 200 | V |
| L | Machine Phase Inductance | 0.5 | mH |
| $C_y = C_w$ | All Parasitic Capacitance | 10 | nF |
| $R_{esr}$ | Equivalent Parasitic Capacitor Resistance | 60 | mΩ |
| $i^*_{hb}$ | Reference Grid Current. Enforced by Controller | 80 | $A_{RMS}$ |
| $f_{sw.inv}$ | Inverter Switching Frequency | 10 | kHz |
| $f_{sw.hb}$ | Half-Bridge Switching Frequency | 10 | kHz |

1) Leakage Current Elimination: The inverter and front-end half-bridge are commanded by a control system which tracks a reference ac grid current.

The modulation is based on a triangular carrier, reflecting a modulation strategy present in industry. As a result, the positive pulse of the gating signal $S_{hb2}$ is phase shifted 180° from the positive pulse of the signal $S_{hb1}$. Similarly, $S_{i}nv2i$ is switched 180° out of phase from $S_{inv1i}$. FIGS. 11A-11D presents the gating signals used in simulation.

FIG. 11A, FIG. 11B, FIG. 11C, FIG. 11D illustrate gating signals used in a naïve approach to modulation, modulated without the usage of galvanic isolation.

Figure 12A:
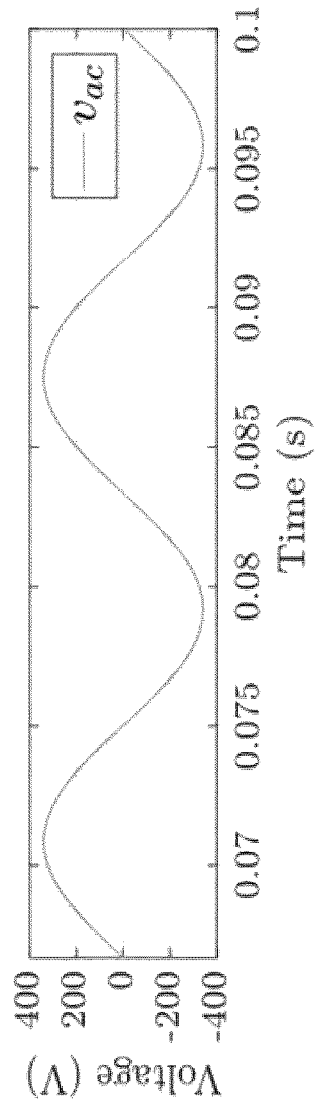
FIG. 12A, 12B, 12C illustrates current and voltage waveform for conventional modulation.
Figure 12B:
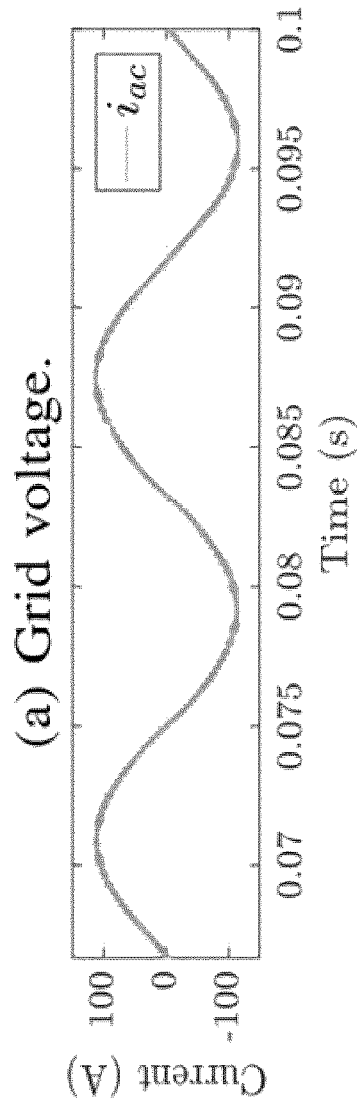
Figure 12C:
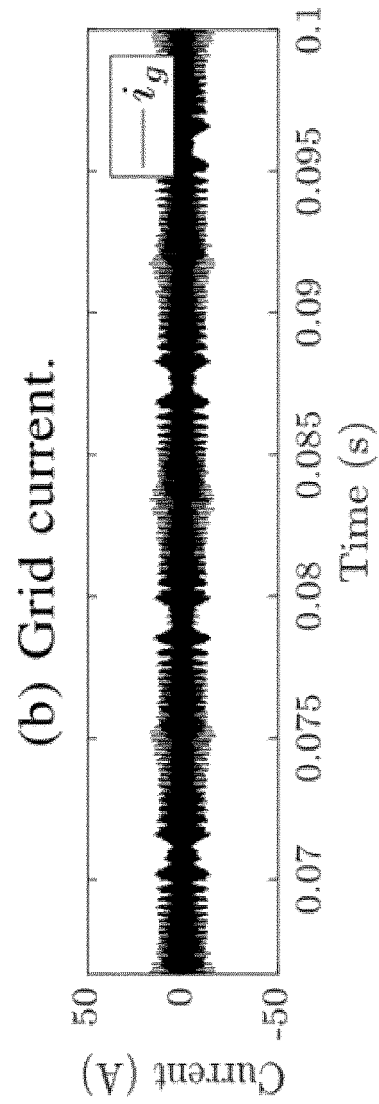

The grid current and voltages are measured in simulation as well as the ac grid ground current. The ac grid ground current has a RMS value of over 7 A, several orders of magnitude above the limit set by the standards. FIGS. 12A-12C presents the waveforms of the simulated system. FIGS. 12A-12C illustrates current and voltage waveform for the naïve approach to modulation.

FIG. 12C in particular shows an undesirable leakage current. The leakage current can be dangerous as the current goes through one AC terminal, and does not come back from another, which means that the current must come back through another form of connection, such as ground. If the current is travelling through ground, it could, for example, pass through a person (e.g., a person touching part of the wall and the floor) and the person could be electrically shocked.

While there are mechanisms to prevent electrical injury that can be utilized, the startling voltage is still undesirable and could cause operational problems. For example, nuisance tripping could occur, whereby ground current interrupters could lead to intermittent stopping. Nuisance tripping was a particular problem in the context of the implementation of an early electric vehicle where the charger intermittently stopped due to current faults. For example, an individual may be seeking to charge a vehicle only to find out that the current was interrupted during charging due to undesirable ground faults occurring.

A second simulation is set up in which the modulation strategy follows (32). In this scenario, the gating signals of the top and bottom subsystem are identical. The resulting gating signals can be seen in FIGS. 13A-D.

FIG. 13A, FIG. 13B, FIG. 13C, FIG. 13D illustrate gating signals for a symmetrical bipolar modulation approach. If the voltages V1 and V2, as shown in FIG. 2, are the same, and the modulation in FIG. 9C, for example, is used, the conditions 32a-32c are met.

Figure 14A:
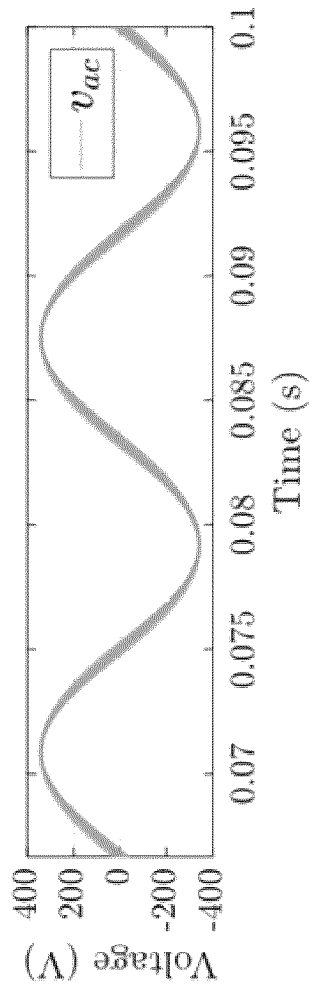
FIG. 14A, FIG. 14B, FIG. 14C illustrate system waveforms for a symmetrical bipolar modulation.
Figure 14B:
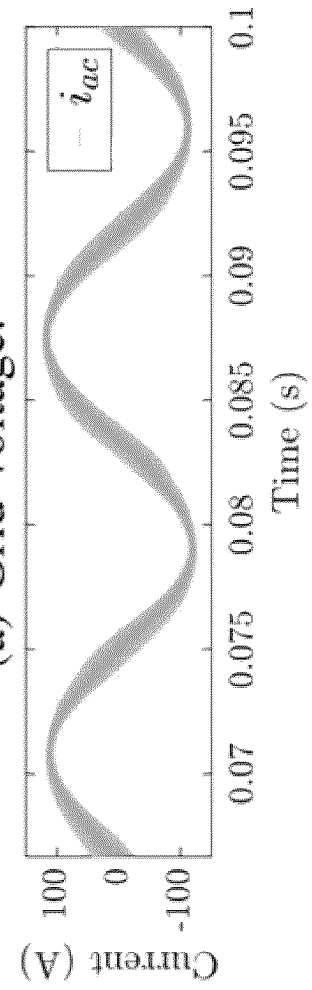
Figure 14C:
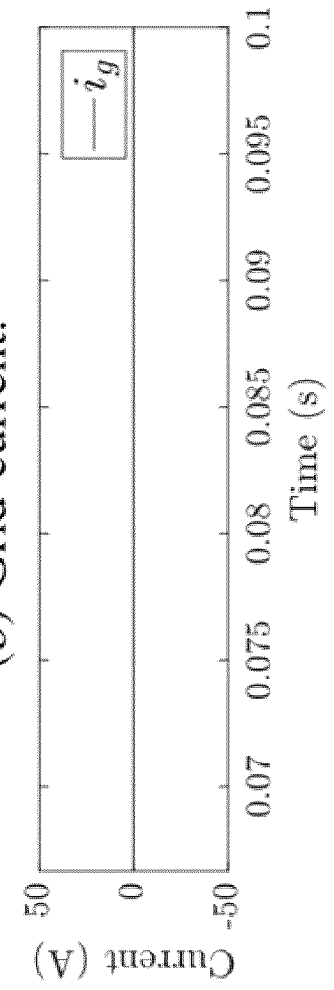
Figure 29:
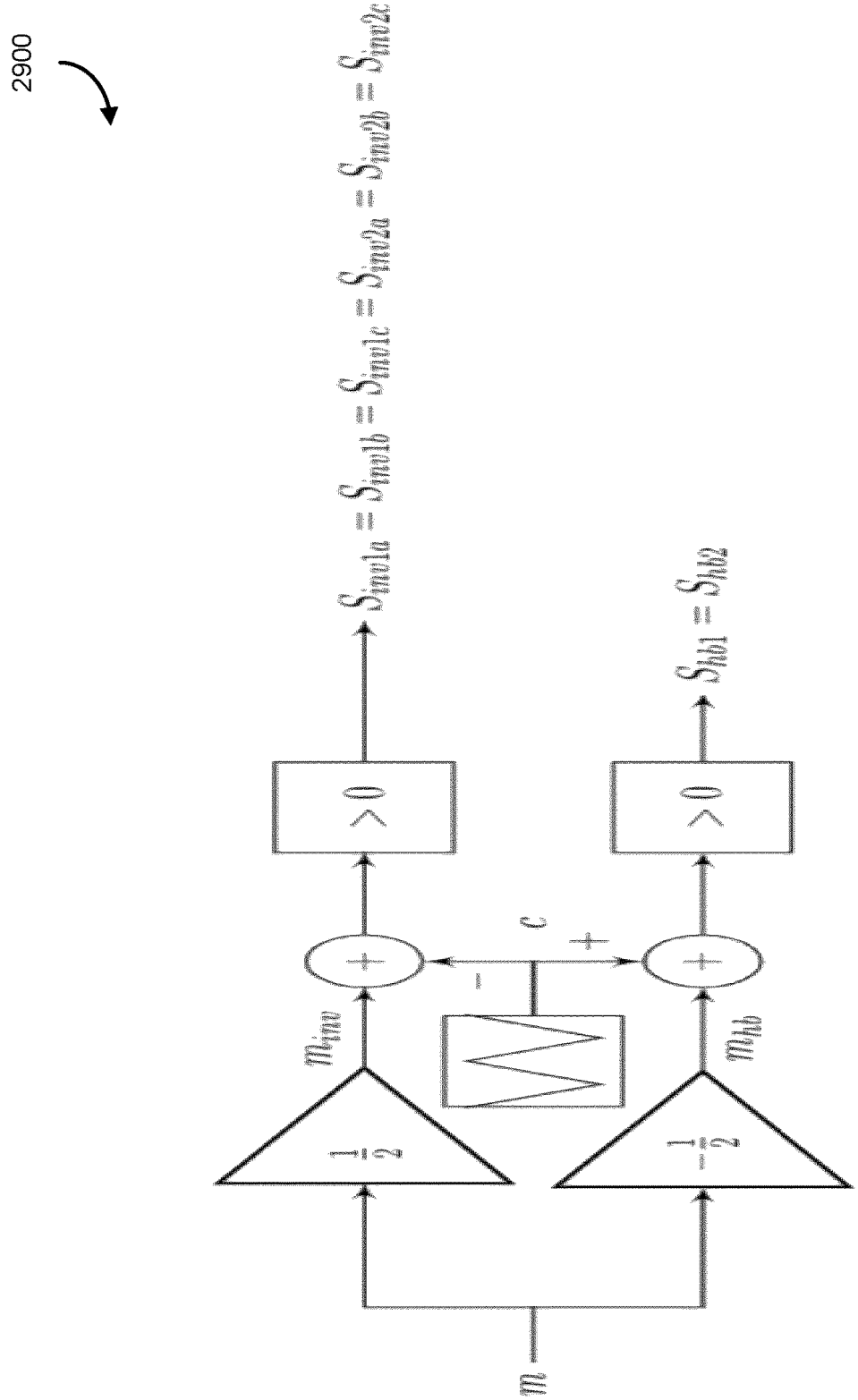
FIG. 29 is used to produce the gating pulses shown in FIGS. 13A-D, according to some embodiments.

The modulation used in these simulations ensures that the system meets the conditions (32a), (32b), and (32c). The modulator 2900 shown in FIG. 29 is used to produce the gating pulses shown in FIG. 13A-D. As these gating pulses are applied to the system, the resulting waveforms are shown in FIGS. 14A-C.

Consequently, the ground leakage current is eliminated, and the system operates in within the recommendations of the relevant safety standards. The simulated waveforms are shown in FIGS. 14A-C. FIG. 14A, FIG. 14B, FIG. 14C.

2) Ripple Mitigation: As shown in the circuit presented in FIG. 6, the elimination of the leakage current, as prescribed in (32), can increase the voltage through the loop, as this technique ensures $v_{inv1,cm} = v_{inv2,cm}$, minimizing the cancellation that the voltage sources $v_{inv1,cm}$ and $v_{inv2,cm}$ offer to one another (see FIG. 4). Similarly, the voltages generated by the ac front-end half-bridge, $v_{hb1,cm}$ and $v_{hb2,cm}$. As a result, the current shown in FIG. 14B displays a much larger ripple than seen in FIG. 12B.

A third simulation is conducted, where the conditions (45) are used in the generation of the gating signals. This technique is equivalent to unipolar PWM modulation, as it is used in full-bridge inverters. The resulting gating signals are shown in FIGS. 15A-15D.

In this mode of operation, not only the signals $S_{hb1}=S_{hb2}$ and $S_{inv1}=S_{inv2}$, but also, the center of the positive semicycle of the gating signal $S_{inv1}$ is aligned with that of $S_{hb1}$, thereby minimizing voltage distortion.

The center of the positive semicycle of the gating pulse shown in FIG. 13A aligns with the center of the negative semicycle of the gating pulse shown in FIG. 13C.

In contrast, the gating approach used to produce FIGS. 15A-D pulses is such that the center of the positive semicycles of the gating pulses shown in FIG. 15A and FIG. 15C are aligned. This alignment of the components of semicycles aligns the odd harmonics of switching voltages, cancelling these harmonics out and minimizing current THD.

The gating pulses shown in FIGS. 13A-D and FIGS. 15A-D are resulting from the same control system, configured to two different phase-shifts.

FIG. 15A, FIG. 15B, FIG. 15C, FIG. 15D illustrate gating signals that can be utilized for a proposed symmetrical unipolar modulation.

Figure 16A:
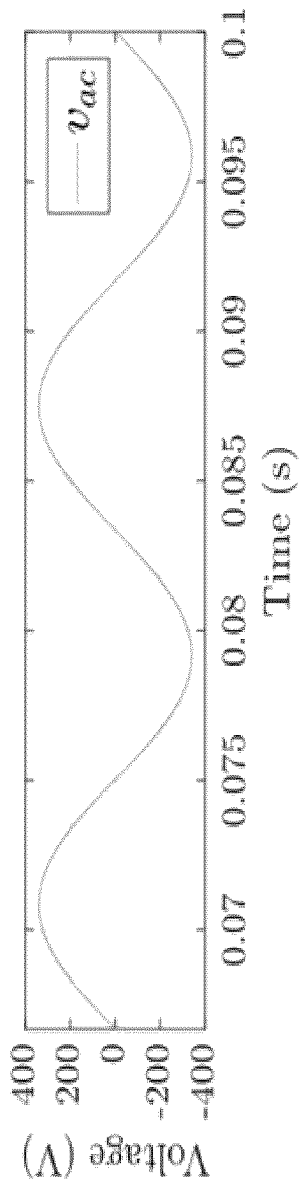
FIG. 16A, 16B, 16C illustrates system waveforms for a proposed symmetrical unipolar modulation.
Figure 16B:
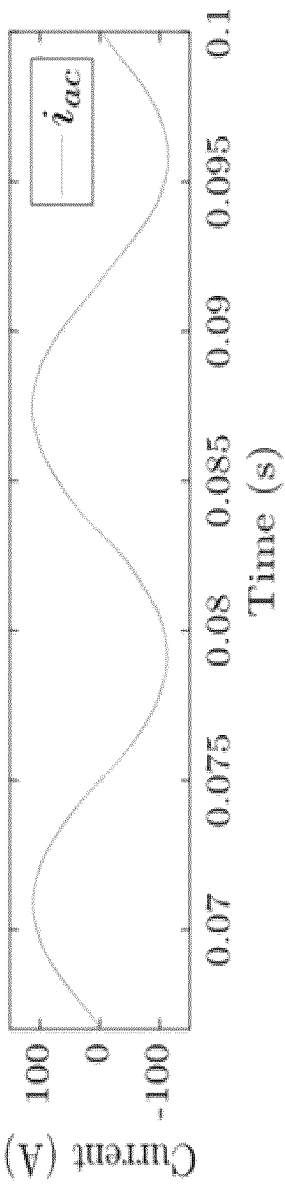
Figure 16C:
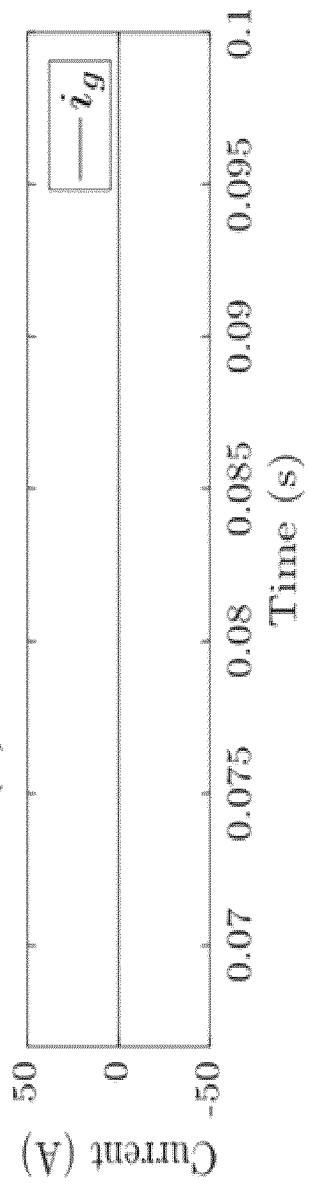

This mode of operation greatly decreases the AC grid current ripple and improves THD performance since this relative phase-shift cancels the odd harmonics of the switching voltage disturbance, in turn cancelling the most significant drivers of current distortion. The resulting waveforms can be seen in FIGS. 16A-16C. It is possible to notice that, not only the system has improved THD performance compared to the symmetrical bipolar case, but also compared to the asymmetrical (conventional) modulation, as it contains strong components of high frequency leakage current ripple. FIGS. 16A-16C illustrates system waveforms for a proposed symmetrical unipolar modulation.

The THD performance improvement in this second approach shown in FIGS. 15A-15D, remove significant contributions to the THD, caused by disturbances around the switching frequency (voltage ripple). The THD removal circuit embodiment is adapted to remove the switching frequency components and odd (1,3,5,7) harmonics (e.g., the higher the harmonic number, the less impact it has—so the lower numbered harmonics contribute more to THD).

The modulation approaches shown in FIGS. 13A-D and FIGS. 15A-D result from similar modulators to the one shown in FIG. 9C. The difference between those is the relative carrier phase-shift between the carriers of the frontend and back-end stages of the converter. A plurality of phase-shifts is possible and the gating pulses shown in FIGS. 13A-D and FIGS. 15A-D are two examples of these possibilities.

In some embodiments, the circuit exhibiting THD improvement is provided through improved software control relative to the—this is for the single phase circuit. The phase shift between the middle point of the positive semi-cycle of the gating of the half-bridge and associated inverter is 0. It is important to note that even the approach without THD improvement is still valuable as the approach is still cheaper than implementing galvanic isolation.

The current ripple reduction can be understood by looking at the profile of the voltage applied to the inductor ($v_L$) shown if FIG. 6. This voltage profile is similar to what is seen in conventional full-bridge inverters.

FIG. 17 provides a comparison of the harmonic components of the voltage. While in the symmetrical bipolar modulation case, shown in FIG. 17A, all harmonics of the switching frequency are present in the voltage, the symmetrical unipolar modulation case, shown in FIG. 17B, the odd components are not present. In particular, the first harmonic has the lowest frequency and the highest power. The absence of the odd harmonics results in great current THD improvement.

For the result shown in FIG. 14B, the THD is approximately 8.3%, while for the result shown in FIG. 16B the THD is improved to 0.7%.

Figure 18A:
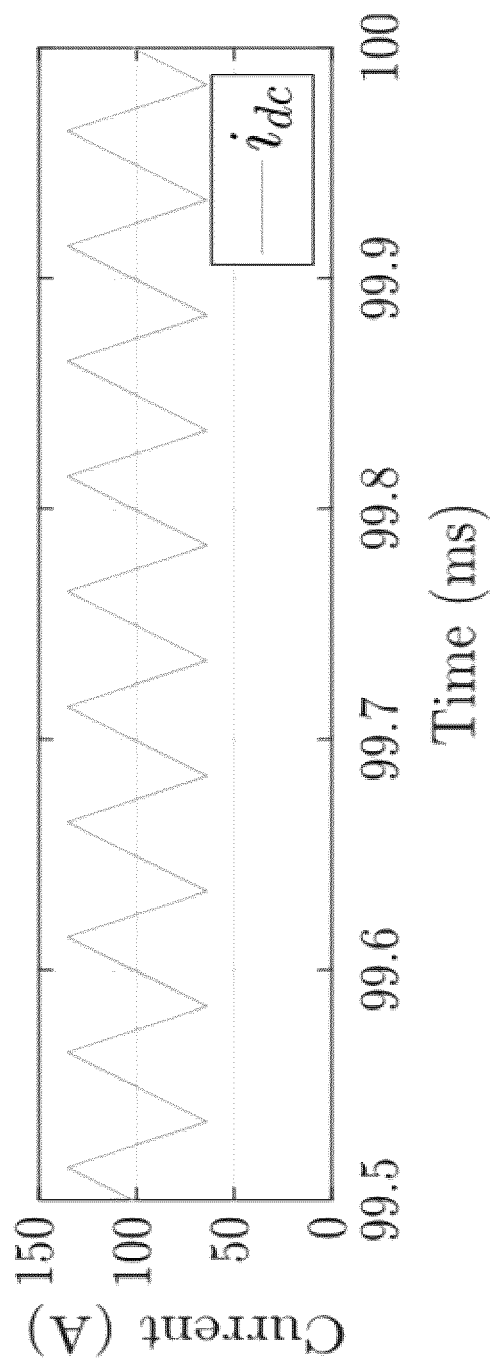
FIG. 18A and FIG. 18B illustrate system waveforms that can be used for a DCDC front-end fast-charger converter.
Figure 18B:
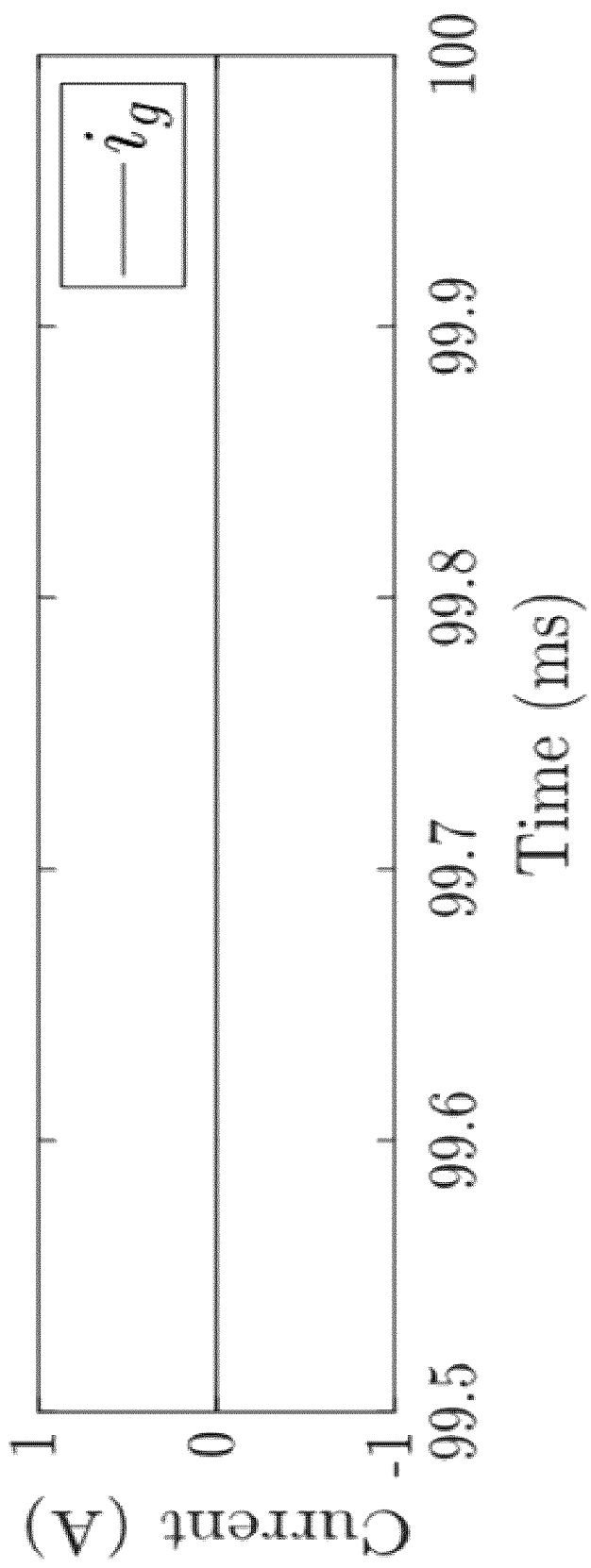

FIG. 17 illustrates a voltage harmonics profile. FIG. 18A and FIG. 18B illustrate system waveforms that can be used for a DC front-end fast-charger converter.

B. DC Front-End Fast-Charger Circuit

TABLE 2

Parameters used in simulation for DC front-end converter.

| Parameter | Description | Value |
| --- | --- | --- |
| $v_{dc}$ | DC Source Voltage | 500 V |
| $t'_1$ | Top ES Voltage | 200 V |
| $t'_2$ | Bottom ES Voltage | 200 V |
| L | Machine Phase Inductance | 0.5 mH |
| $C_y = C_w$ | All Parasitic Capacitance | 10 nF |
| $R_{esr}$ | Equivalent Parasitic Capacitor Resistance | 60 m$\Omega$ |
| $i^*_{batt}$ | Reference Battery Current. Enforced by Controller | 100 A |
| $f_{sw.inv}$ | Inverter Switching Frequency | N/A |
| $f_{sw.dc}$ | DC Front-End Switching Frequency | 10 kHz |

The circuit shown in FIG. 7 is also simulated using the parameters shown in Table 2.

As described herein, a discussion of the importance of the presence of common-mode currents on non-isolated converter is presented.

This issue has ramifications in both safety and competitiveness, as transformers are typically the solution of choice and may introduce severe disadvantages for high power circuits. A common-mode performance analysis is realized, to shed light on the tools that may be used to address common-mode leakage currents without the utilization of isolation transformers, resulting in cheaper, more power dense and efficient converter topologies.

A modulation technique capable of significantly reducing or eliminating common-mode leakage current on symmetrical non-isolated converters is introduced. The proposed modulation, can, in some approaches, require zero additional hardware and can impose minimum or no additional cost onto power converters. One suitable application for the discussed technique is the charging of electric vehicles, where the increased density and efficiency could have decisive commercial implications, since such features are intimately linked with vehicle range and charging time.

A novel symmetrical DC fast-charging topology based on the dual-inverter drivetrain is also introduced which is also compatible with the presented modulation. The modulation is specified for both a single-phase symmetrical charger and the newly proposed symmetrical DC fast charger. The modulation technique is also generalized for any symmetrical topology.

Simulation verification is performed for both the single-phase charging circuit and the DC fast charger. The proposed modulation successfully eliminates the common-mode leakage current, while maintaining the capability to achieve secondary objectives, such as THD improvement and efficiency optimization.

The techniques introduced here are necessary for the operation of non-isolated integrated chargers using dual inverter drivetrain. Failure to use this modulation results in high leakage currents, failure to meet regulatory standards and endangerment of operators and passersby. Various embodiments described herein provide a technical solution for safe operation and commercialization of charger circuits.

EXPERIMENTS

Figure 24:
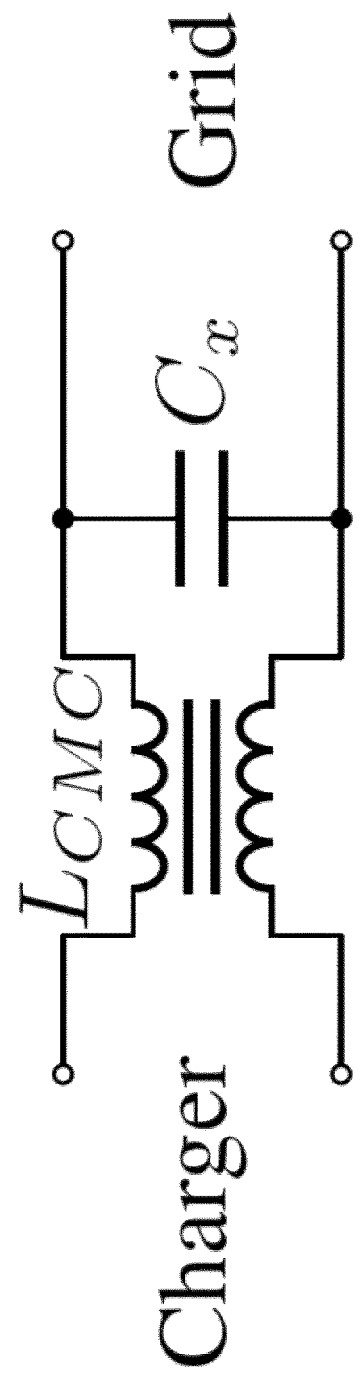
FIG. 24 illustrates an example connection filter utilized in the experimental approaches, according to some embodiments.
Figure 25:
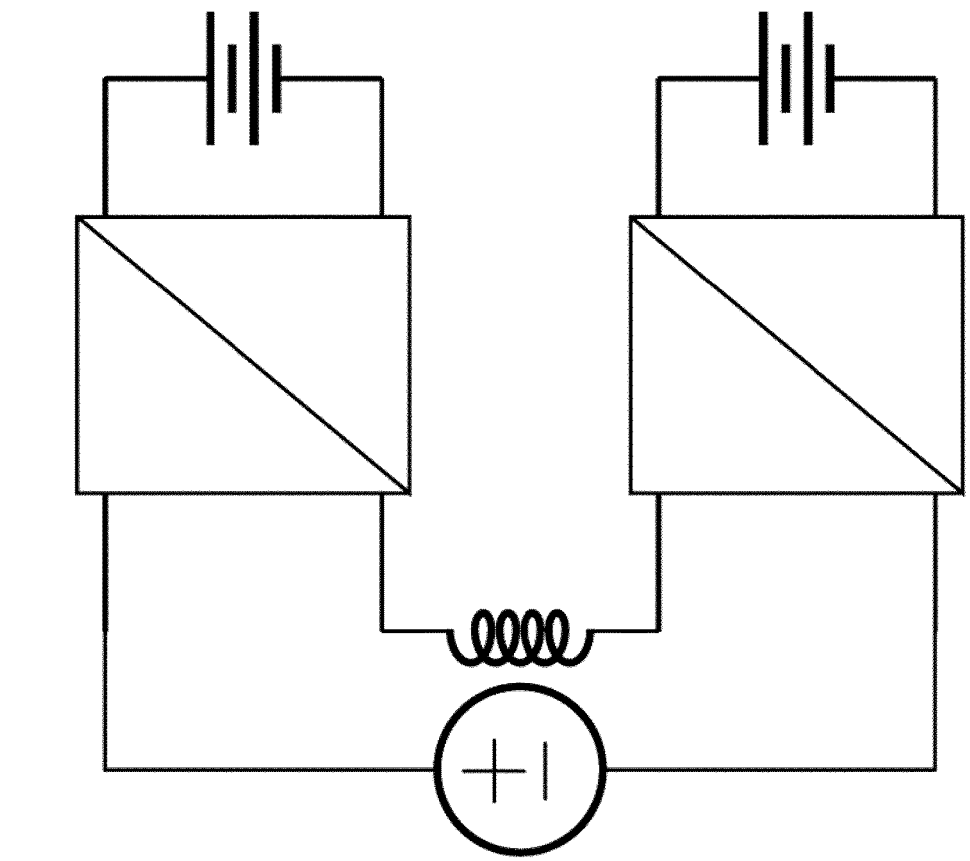
FIGS. 25-28 are example retrofit circuits, according to some embodiments.
Figure 26:
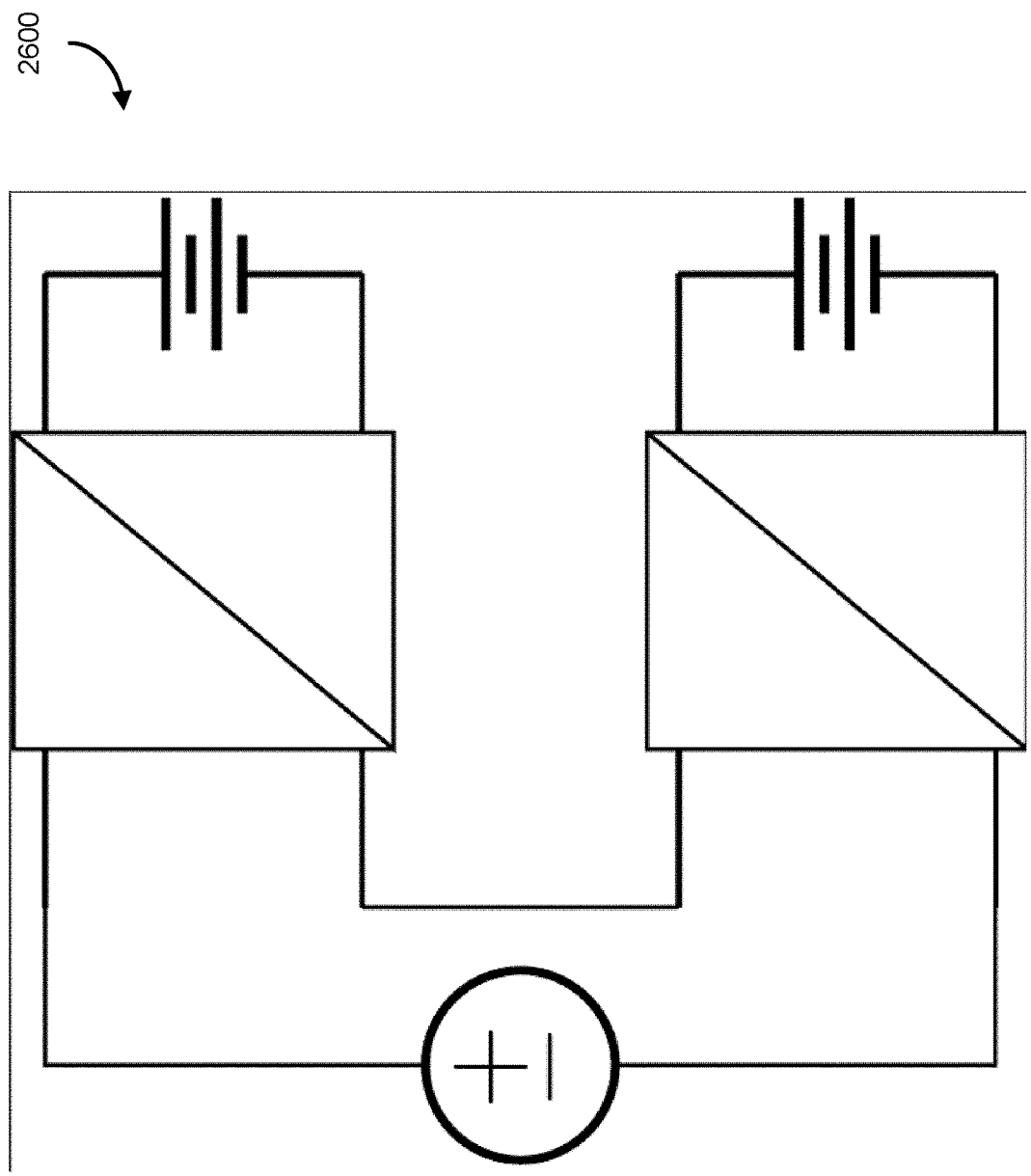
Figure 27:
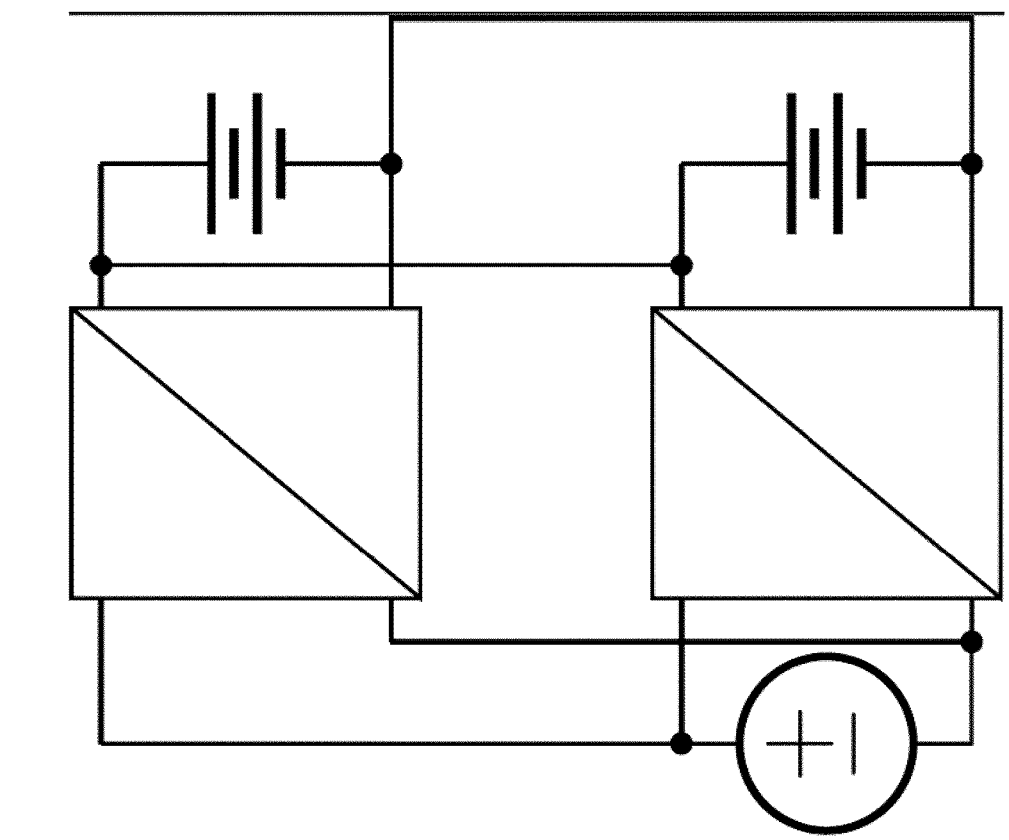
Figure 28:
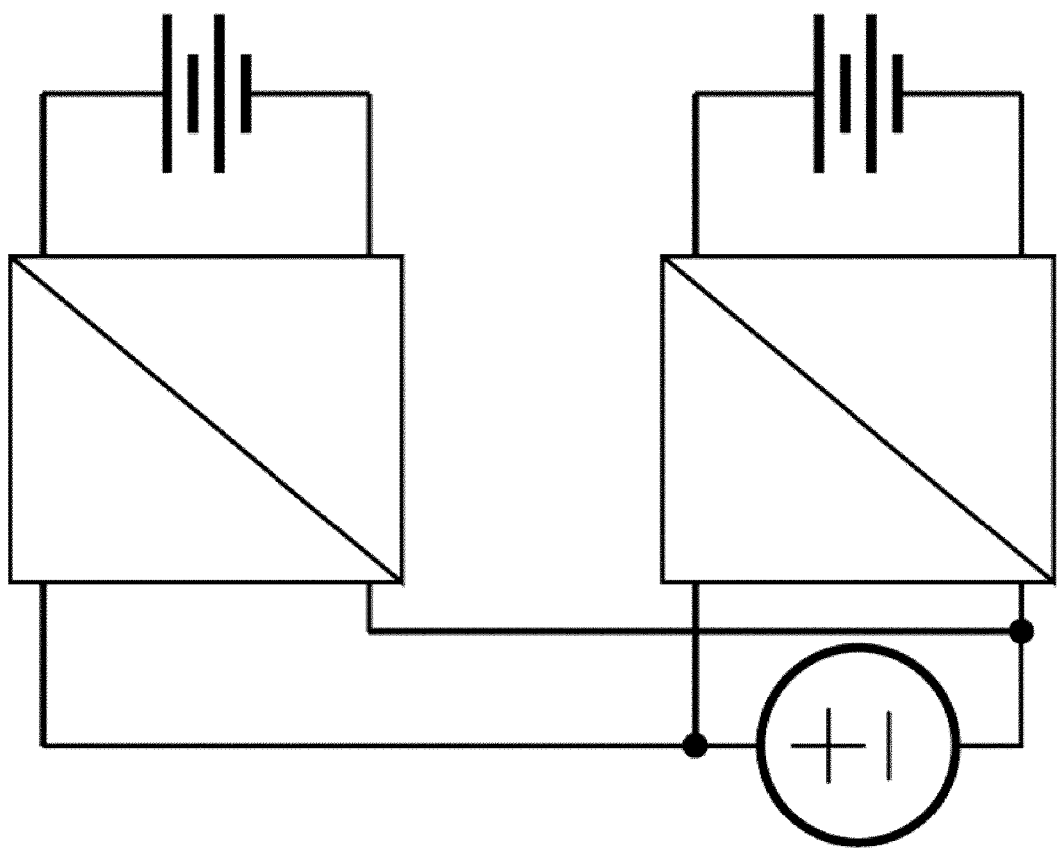

An experimental setup was constructed to verify the conclusions arrived by the aforementioned analysis and simulations. In this experiment, the dual inverter drivetrain single-phase charger, as shown in FIG. 2 is used for battery charging operation, with the addition of an x capacitor designed to minimize noise at the grid connection point, facilitating AC grid voltage measurement. The other addition is a common-mode inductance $L_{CMC}$, which is included to alleviate any small leakage current arising from nonideal symmetry. The connection filter 2400 is shown in FIG. 24.

The system is then operated in three different conditions:
Nonisolated with asymmetrical modulation, wherein a naïve modulation, not obeying the conditions laid out in equations 32a-32c.
Isolated with asymmetrical modulation, wherein a galvanic isolation transformer was included in the 60 Hz input AC voltage. The inclusion of galvanic isolation reflects the majority of the current commercial solutions.
Nonisolated with the proposed symmetrical modulation.

Figure 19A:
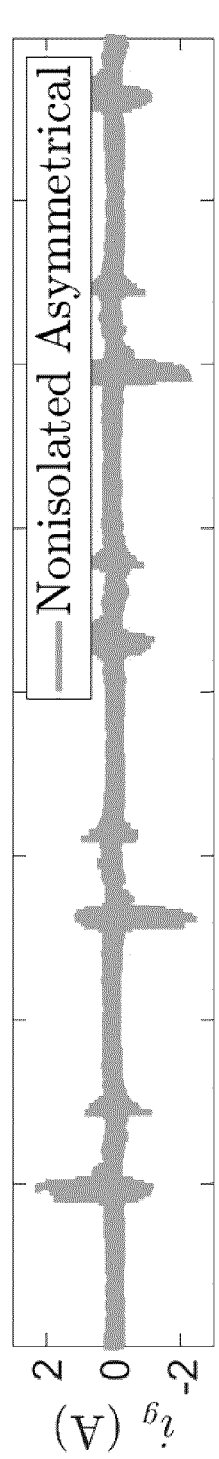
FIG. 19A.
Figure 19B:
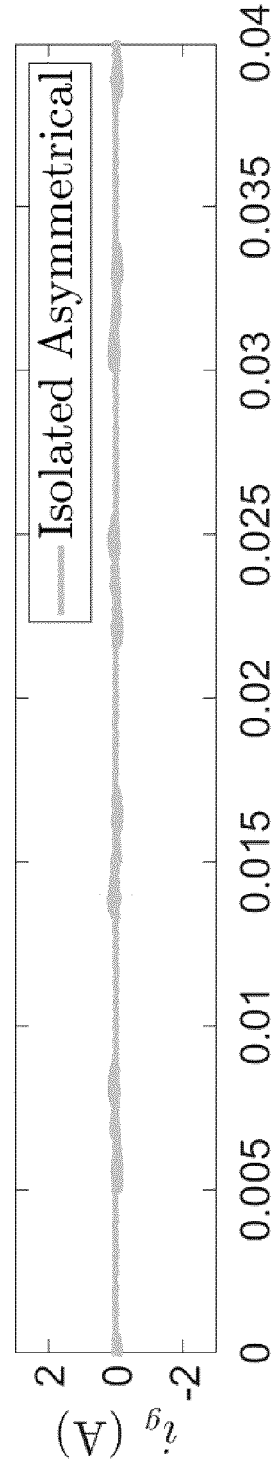
FIG. 19B, and FIG. 19C are experimental plots showing an improved leakage current response for a proposed non-isolated symmetrical circuit, relative to nonisolated asymmetrical, and isolated asymmetrical examples, according to some embodiments.
Figure 19C:
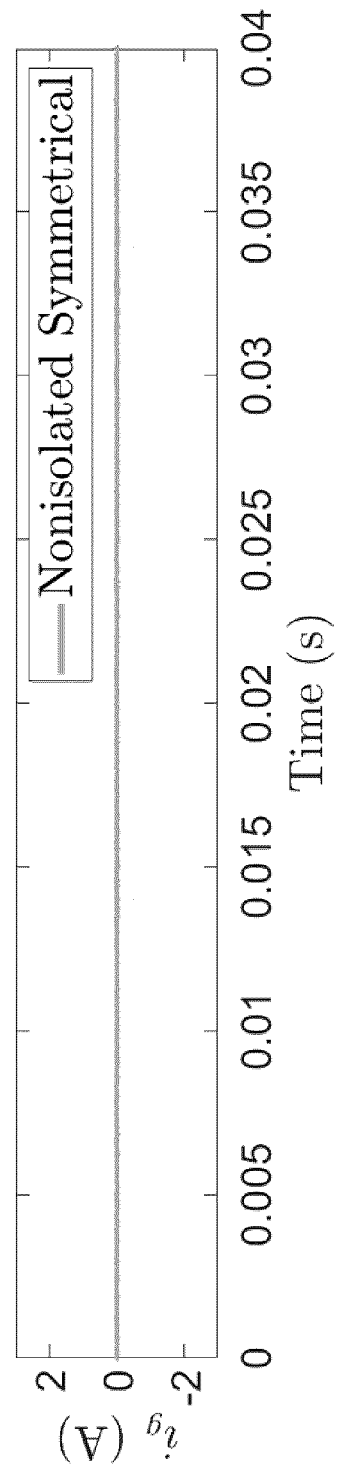

FIG. 19A. FIG. 19B, and FIG. 19C are experimental plots showing an improved leakage current response for a proposed non-isolated symmetrical circuit, relative to non-isolated asymmetrical, and isolated asymmetrical examples, according to some embodiments. FIGS. 19A-19C show that, not only the symmetrical modulation nearly eliminates the ground currents of non-isolated systems, but also that it exhibits less leakage current than isolated solutions.

EXAMPLE CIRCUITS

Figure 20:
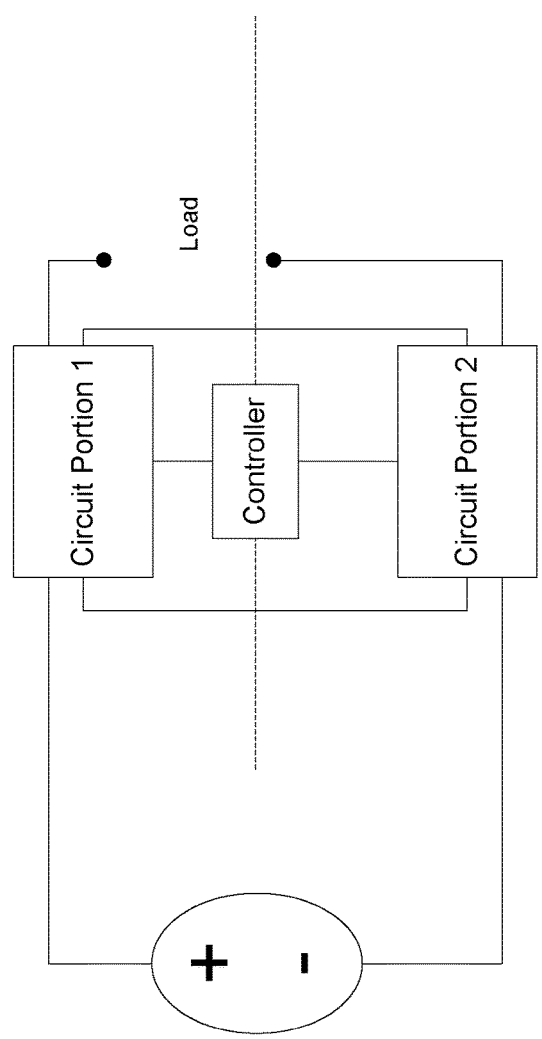
FIG. 20 is an example retrofit circuit showing an axis of symmetry, according to some embodiments.

FIG. 20 is an example retrofit circuit 2000 showing an axis of symmetry, according to some embodiments. In this example, an example circuit can be retrofit by adding components to mirror the circuit, and flipping all of the components.

After mirroring the components, one could connect the negative terminal to the positive terminal, and the positive terminal and the negative terminal to the load. Placing the two equivalent circuits together, while the component count increases, but the power specification is the same because half power is provided to each.

A controller circuit that is used to modulate signals is configured the follow the signal rules described in embodiments above such that corresponding switches are controlled in tandem. The signals, for example, can be generated using a digital signal processor or a waveform generator (e.g., as pulses). While the component matching may introduce some non-idealities, Applicants note that the circuit should likely perform better than galvanic isolation (which also has non-idealities due to parasitic voltages/currents).

Figure 21:
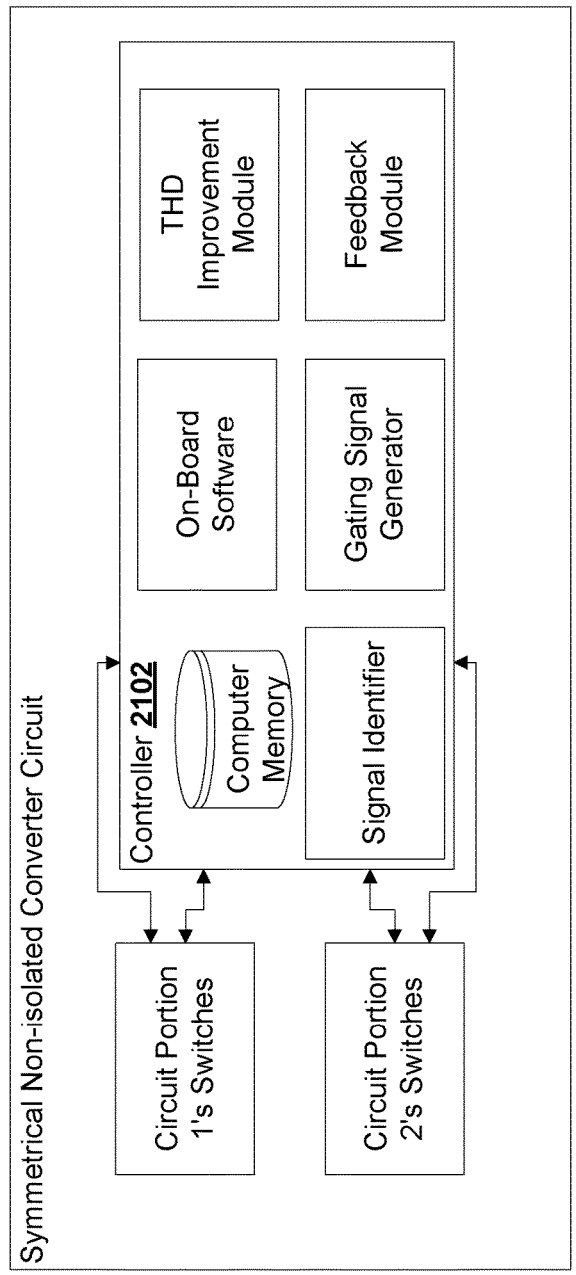
FIG. 21 is an example circuit being coupled to an example controller circuit, according to some embodiments.

A controller circuit 2102 may be provided, for example, in accordance the example diagram 2100 of FIG. 21, having on-board software, optionally a THD improvement module, a signal identifier, a gating signal generator, and an optional feedback tracking module. The controller circuit is adapted to modulate signals to control switches of circuit portions 1 and 2 in accordance with the rules described herein, operating switches in tandem.

Figure 22:
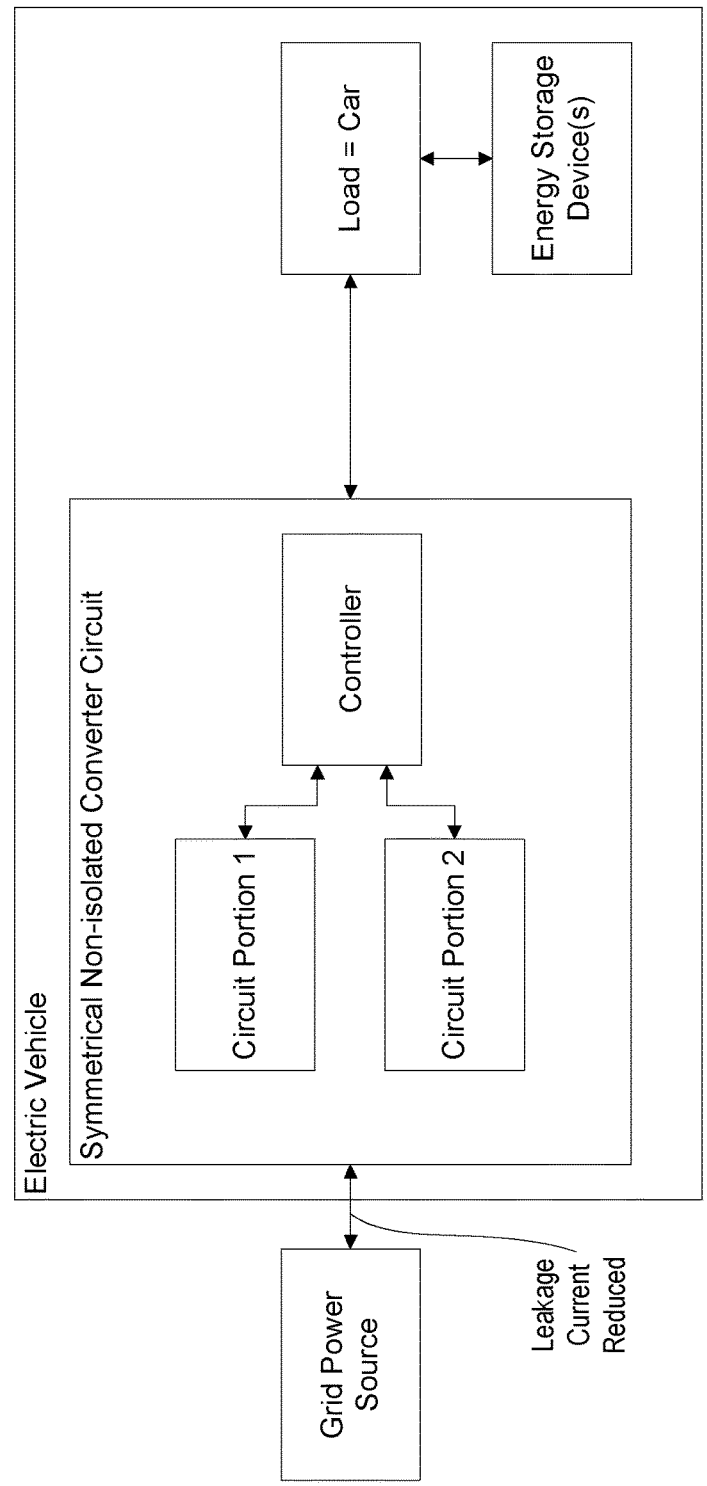
FIG. 22 is an example practical implementation schematic where the circuit resides as part of the circuitry on an electric vehicle, according to some embodiments.

FIG. 22 is an example practical implementation schematic 2200 where the circuit resides as part of the circuitry on an electric vehicle, according to some embodiments. In this example, the improved non-isolated converter circuit may be adapted to reside on or coupled to an electric vehicle such that the converter circuit travels with the electric vehicle and is used whenever the vehicle is charging. In this example, because the circuit does not need galvanic isolation, the circuit volume and expense may be sufficiently reduced such that having the circuit on-board becomes a practically viable option.

Figure 23:
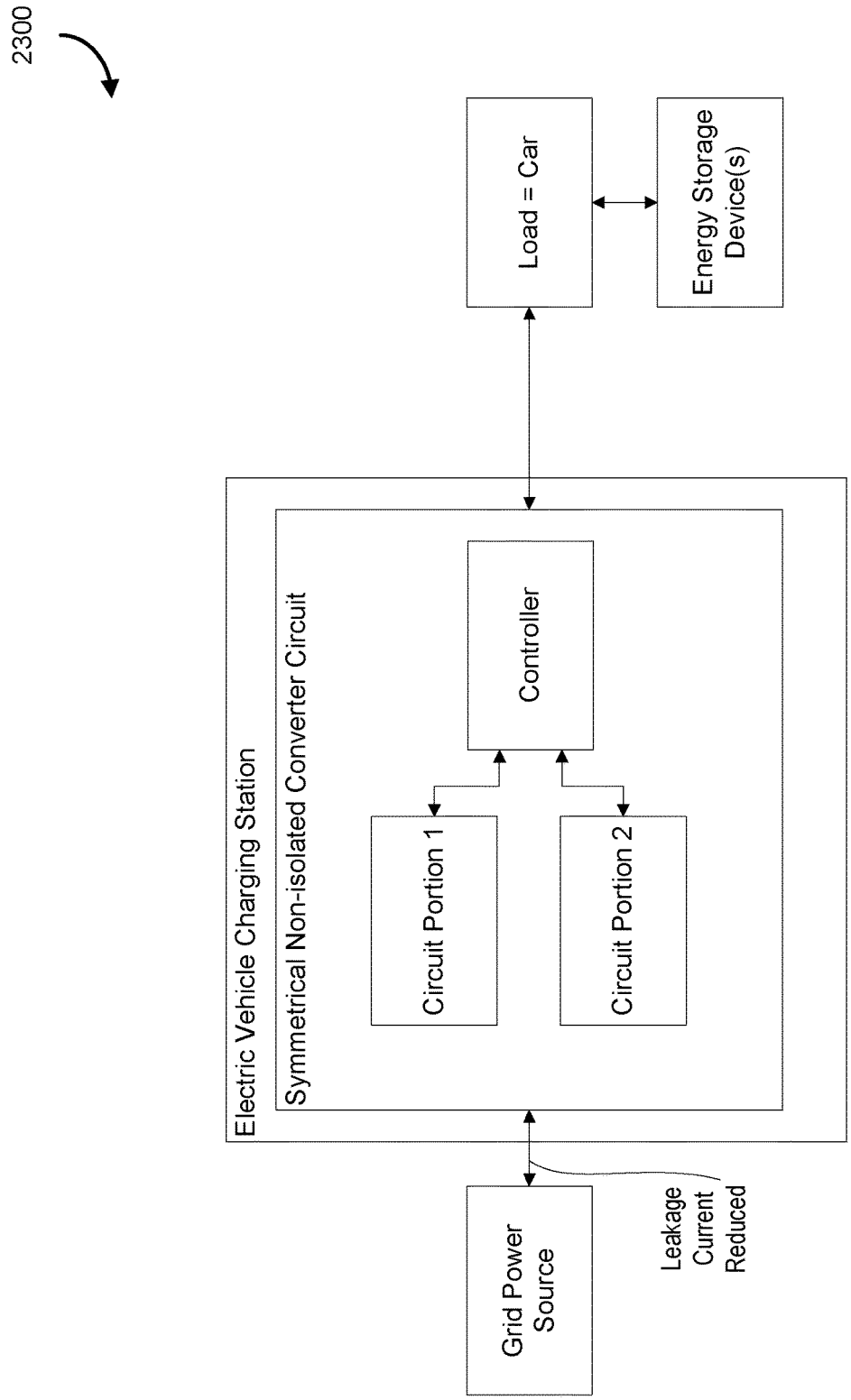
FIG. 23 is an example practical implementation schematic where the circuit resides as part of the circuitry on a charger for an electric vehicle, according to some embodiments.

FIG. 23 is an example practical implementation schematic 2300 where the circuit resides as part of the circuitry of a charging station for electric vehicles, according to some embodiments. In this example, the improved non-isolated converter circuit may be adapted to reside on or coupled to a fast charger or a charging station such that the circuit is used for charging multiple vehicles safely.

FIGS. 25-28 are example retrofit circuits 2500, 2600, 2700, and 2800, according to some embodiments.

REFERENCES

P. He and A. Khaligh, "Design of 1 kw bidirectional half-bridge CLLC converter for electric vehicle charging systems," IEEE International Conference on Power Electronics, Drives and Energy Systems, PEDES 2016, vol. 2016-January, pp. 1-6, 2017.

M. Yilmaz and P. T. Krein, "Review of Battery Charger Topologies, Charging Power Levels, and Infrastructure for Plug-In Electric and Hybrid Vehicles," IEEE Transactions on Power Electronics, vol. 28, no. 5, pp. 2151-2169, 2013.

S. Y. Kim, S. Member, H.-s. Song, and K. Nam, "Idling Port Isolation Control of Three-Port Bidirectional Converter for EVs," IEEE Transactions on Power Electronics, vol. 27, no. 5, pp. 2495-2506, 2012.

A. Mattsson, V. Vaisanen, P. Nuutinen, T. Kaipia, A. Lana, P. Peltoniemi, P. Silventoinen, and J. Partanen, "Implementation design of the converter-based galvanic isolation for low voltage DC distribution," 2014 International Power Electronics Conference, IPEC-Hiroshima—ECCE Asia 2014, pp. 587-594, 2014.

Y. Du, X. Zhou, S. Bai, S. Lukic, and A. Huang, "Review of non-isolated bi-directional DC-DC converters for plug-in hybrid electric vehicle charge station application at municipal parking decks," Conference Proceedings—IEEE Applied Power Electronics Conference and Exposition—APEC, no. 1, pp. 1145-1151, 2010.

Y. Zhang, G. Yang, X. He, M. Elshaer, W. Perdikakis, H. Li, C. Yao, J. Wang, K. Zou, Z. Xu, and C. Chen, "Leakage Current Issue of Non-Isolated Integrated Chargers for Electric Vehicles," 2018 IEEE Energy Conversion Congress and Exposition, ECCE 2018, pp. 1221-1227, 2018.

S. Semsar, T. Soong, and P. W. Lehn, "Integrated Single-Phase Electric Vehicle Charging Using a Dual-Inverter Drive," 2018 IEEE Transportation and Electrification Conference and Expo, ITEC 2018, no. d, pp. 320-325, 2018.

Y. Lee and J. I. Ha, "Hybrid modulation of dual inverter for open-end permanent magnet synchronous motor," IEEE Transactions on Power Electronics, vol. 30, no. 6, pp. 3286-3299, 2015.

M. O. Crosato and I. W. Hofsajer, "Minimising conducted common mode EMI by charge balancing in a non isolated DC-DC converter," PESC Record—IEEE Annual Power Electronics Specialists Conference, vol. 4, pp. 3146-3151, 2004.

B. Yang, W. Li, Y. Gu, W. Cui, and X. He, "Improved transformerless inverter with common-mode leakage current elimination for a photovoltaic grid-connected power system," IEEE Transactions on Power Electronics, vol. 27, no. 2, pp. 752-762, 2012.

J. Kalaiselvi and S. Srinivas, "Bearing currents and shaft voltage reduction in dual-inverter-fed open-end winding induction motor with reduced CMV PWM methods," IEEE Transactions on Industrial Electronics, vol. 62, no. 1, pp. 144-152, 2015.

L. Zubieta and D. Frost, "Method for power transfer between DC circuits," Apr. 3 2018, U.S. Pat. No. 9,935, 544.

A. D. Brovont and S. D. Pekarek, "Derivation and Application of Equivalent Circuits to Model Common-Mode Current in Microgrids," IEEE Journal of Emerging and Selected Topics in Power Electronics, vol. 5, no. 1, pp. 297-308, 2017.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method for modulating common mode leakage current in electric power circuits interfacing two energy storage devices, two energy sources, or; one energy storage device and one energy source; to a voltage source, the method comprising:
controlling a plurality of switches of an electrically symmetrical electric power circuit, such that one or more electrically symmetrical pairs of switches of the plurality of switches are operated at a same operational state when the power circuit is coupled to an electrical grid to reduce the common mode leakage current;
wherein each switch of the one or more electrically symmetrical pairs of switches has a switched node that is connected by a symmetrical branch and are electrically symmetrical across a symmetry axis; and
wherein the symmetry axis is defined around any electrical point that has equal or approximately equal impedance to the switched nodes of the electrically symmetrical pair of switches; and
wherein the electrically symmetrical electric power circuit is free of power isolation.

2. The method of claim 1, wherein the electrically symmetrical pairs of switches are equidistant to the symmetry axis.

3. The method of claim 1, wherein the electrically symmetrical electric power circuit is a dual inverter drive.

4. The method of claim 3, wherein the dual inverter drive is a single phase charger that has two mirrored electrical pathways, each electrical pathway including an active rectifier stage, an energy storage device, and three inverter stages, each of the three inverter stages coupled to a symmetrical counterpart across an inductive winding.

5. The method of claim 4, wherein the active rectifier has a switch Shb1, and the switch Shb1 switches at a grid frequency of the electrical grid.

6. The method of claim 5, wherein the switch Shb1 has a complementary switch Shb2, and switching of the switch Shb1 and the switch Shb2 are synchronized such that positive pulses correspond temporally together and negative pulses correspond temporally together.

7. The method of claim 4, wherein corresponding switches of each of the three inverter stages is operated in tandem to have the same operational state, each of the three inverter stages operated at a grid frequency of the electrical grid.

8. The method of claim 7, wherein the active rectifier has a switch Shb1, and the switch Shb1 switches at the grid frequency of the electrical grid; and a center of an ON operational state of the switch Shb1 is synchronized relative to a center of at least one ON operational state correspond to at least one of the three inverter stages.

9. The method of claim 1, wherein all active electrical elements of the electrically symmetrical electric power circuit have symmetrical counterpart elements, the active electrical elements including at least one of voltage and current sources.

10. The method of claim 9, wherein the electrically symmetrical electric power circuit is free of power isolation during grid-tied activity.

11. The method of claim 1, wherein the electrically symmetrical electric power circuit is a dual inverter based DC charger with a four switch symmetrical buck DC-DC front end.

12. The method of claim 11, wherein the electrically symmetrical electric power circuit includes an active rectifier having a switch Shb1, and the switch Shb1 is operated in an ON operational state.

13. The method of claim 11, wherein the electrically symmetrical electric power circuit includes three inverter stages, each of the three inverter stages coupled to a symmetrical counterpart across an inductive winding, and corresponding switches of each of the three inverter stages is operated in an OFF operational state.

14. The method of claim 11, wherein the electrically symmetrical electric power circuit includes an active rectifier having a switch Shb1;
wherein the electrically symmetrical electric power circuit includes three inverter stages, each of the three inverter stages coupled to a symmetrical counterpart across an inductive winding, and corresponding switches of each of the three inverter stages is operated in tandem to have the same operational state; and
wherein the active rectifier has a switch Shb1, and the switch Shb1 switches at the grid frequency of the electrical grid; and a center of an ON operational state of the switch Shb1 is synchronized relative to a center of at least one ON operational state correspond to at least one of the three inverter stages.

15. The method of claim 1, wherein the electric power circuits include an unsymmetrical electric power circuit, the method comprising establishing two symmetrical copies of the unsymmetrical electric power circuit wherein each symmetrical copy processes half of an input power.

16. The method of claim 15, wherein the input of each one of the two symmetrical portions of the circuits are in series.

17. The method of claim 15, wherein the input of each on of the two symmetrical portions of the circuit are connected in parallel.

18. The method of claim 15, wherein the output of each on of the two symmetrical portions of the circuit are in parallel or in series.

19. An electrically symmetrical electric power circuit, the electrically symmetrical electric power circuit comprising:
a controller circuit configured to control a plurality of switches of the electrically symmetrical electric power circuit, such that one or more electrically symmetrical pairs of switches of the plurality of switches are operated at a same operational state when the power circuit is coupled to an electrical grid to reduce the common mode leakage current;
wherein each switch of the one or more electrically symmetrical pairs of switches has a switched node that is connected by a symmetrical branch and are electrically symmetrical across a symmetry axis;
wherein the symmetry axis is defined around any electrical point that has equal or approximately equal impedance to the switched nodes of the electrically symmetrical pair of switches; and
wherein the electric symmetrical electric power circuit is free of power isolation.

20. A controller circuit for controlling operation of an electrically symmetrical electric power circuit, the controller circuit comprising:
a hardware processor configured to control a plurality of switches of the electrically symmetrical electric power circuit, such that one or more electrically symmetrical pairs of switches of the plurality of switches are operated at a same operational state when the power circuit is coupled to an electrical grid to reduce the common mode leakage current;

wherein each switch of the one or more electrically symmetrical pairs of switches has a switched node that is connected by a symmetrical branch and are electrically symmetrical across a symmetry axis; and wherein the symmetry axis is defined around any electrical point that has equal or approximately equal impedance to the switched nodes of the electrically symmetrical pair of switches.

\* \* \* \* \*